(12) United States Patent
Warner et al.

(10) Patent No.: US 6,301,930 B1
(45) Date of Patent: Oct. 16, 2001

(54) APPARATUS FOR WASHING CURVED SHEETS OF GLASS AND CORRESPONDING METHOD

(75) Inventors: Jeffrey D. Warner, Deleware; Christopher Wetz, Findlay; Michael Johnson, Upper Sundusky, all of OH (US)

(73) Assignee: Guardian Industries Corporation, Auburn Hills, MI (US)

( * ) Notice: Subject to any disclaimer, the term of this patent is extended or adjusted under 35 U.S.C. 154(b) by 0 days.

(21) Appl. No.: 09/332,199

(22) Filed: Jun. 14, 1999

(51) Int. Cl.[7] ............... B08B 3/02; C03C 19/00
(52) U.S. Cl. ............ 65/27; 65/168; 65/DIG. 13; 134/72; 134/129
(58) Field of Search ............... 65/27, 61, 168, 65/268, DIG. 13; 134/68, 72, 129, 131, 144, 145, 172

(56) References Cited

U.S. PATENT DOCUMENTS

| | | |
|---|---|---|
| 2,311,014 * | 2/1943 | Woolford . |
| 3,706,317 * | 12/1972 | Fox et al. . |
| 3,931,790 * | 1/1976 | Franz . |
| 4,352,221 | 10/1982 | Revells et al. . |
| 4,420,003 | 12/1983 | Lee et al. . |
| 4,558,480 | 12/1985 | Okafuji et al. . |
| 4,946,513 * | 8/1990 | Del Prato et al. . |
| 5,005,250 | 4/1991 | Trautmann et al. . |
| 5,010,619 | 4/1991 | Lise . |
| 5,068,977 | 12/1991 | Syori et al. . |
| 5,263,219 | 11/1993 | Jibiki . |
| 5,353,462 | 10/1994 | Ueno et al. . |
| 5,378,308 * | 1/1995 | Thoms . |
| 5,406,665 | 4/1995 | Czopek et al. . |

\* cited by examiner

*Primary Examiner*—Michael P. Colaianni
(74) *Attorney, Agent, or Firm*—Nixon & Vanderhye P.C.

(57) ABSTRACT

An apparatus and corresponding method for cleaning curved sheets of glass. The apparatus indexes glass sheets in a non-continuous manner through at least a pre-washing zone, a washing zone, a rinsing zone, and/or a drying zone. The glass sheets proceed through any or all of these zones in a substantially upright orientation in certain embodiments. In at least one of the wet zones, a robot arm manipulates a plurality of spray nozzles so as to follow the contour of at least one major surface of the glass. The nozzles may be manipulated back and forth across the surface in order to rinse and/or wash the glass. A similar manipulation of air knives along the contour of the glass sheet may be utilized in the drying zone.

9 Claims, 20 Drawing Sheets

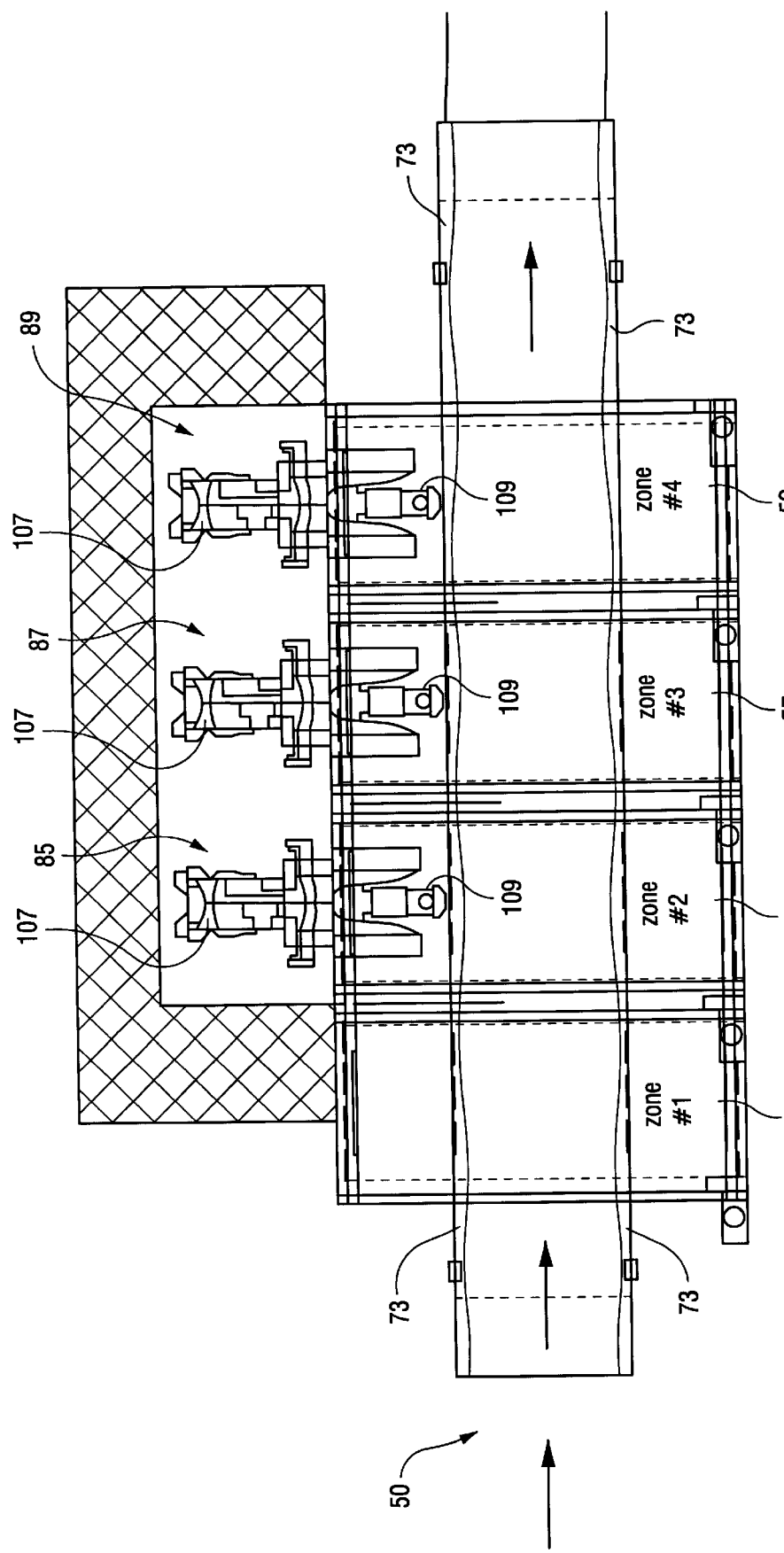

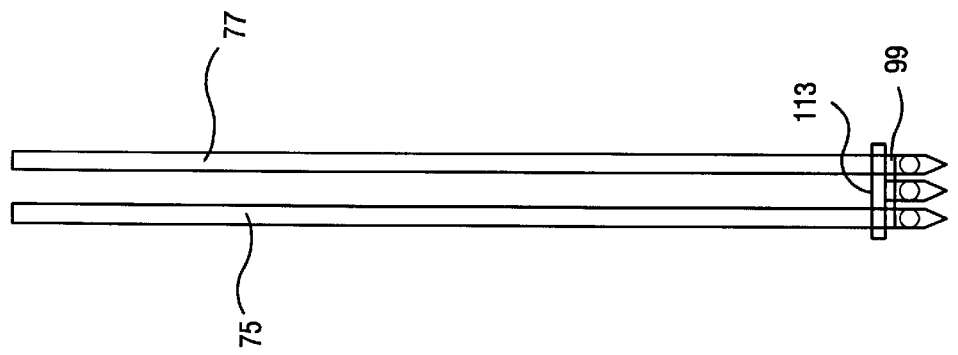
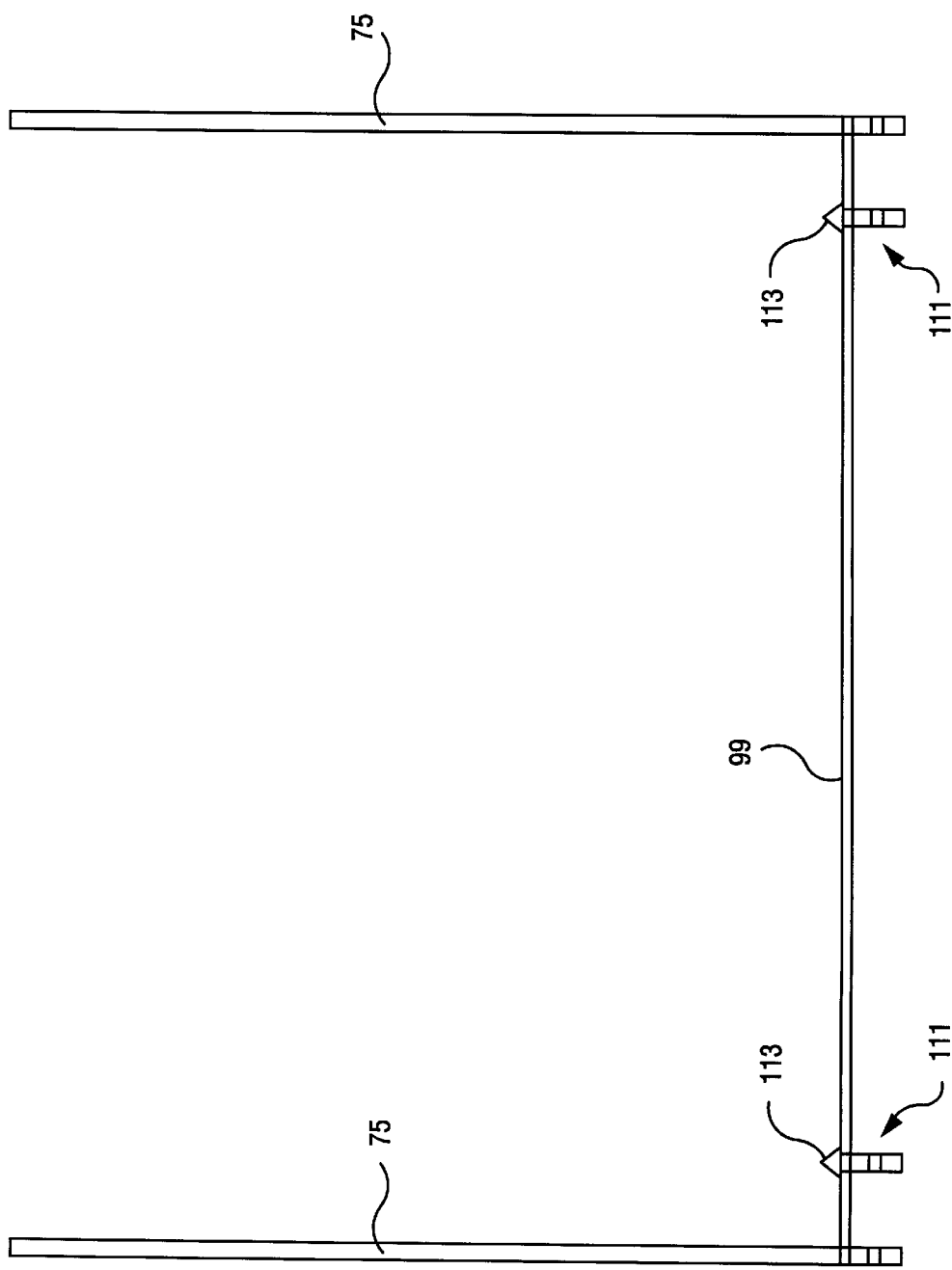

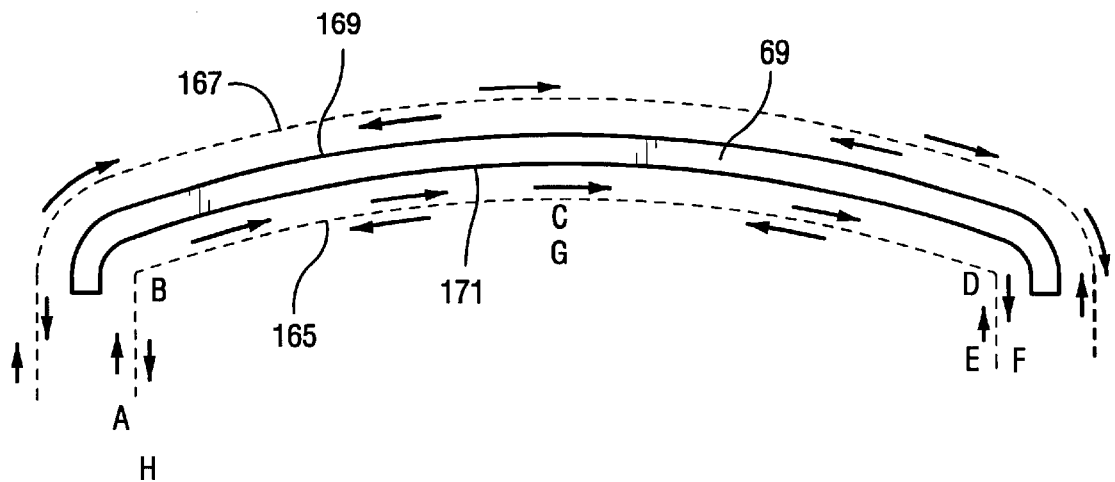
Fig. 16 (b)
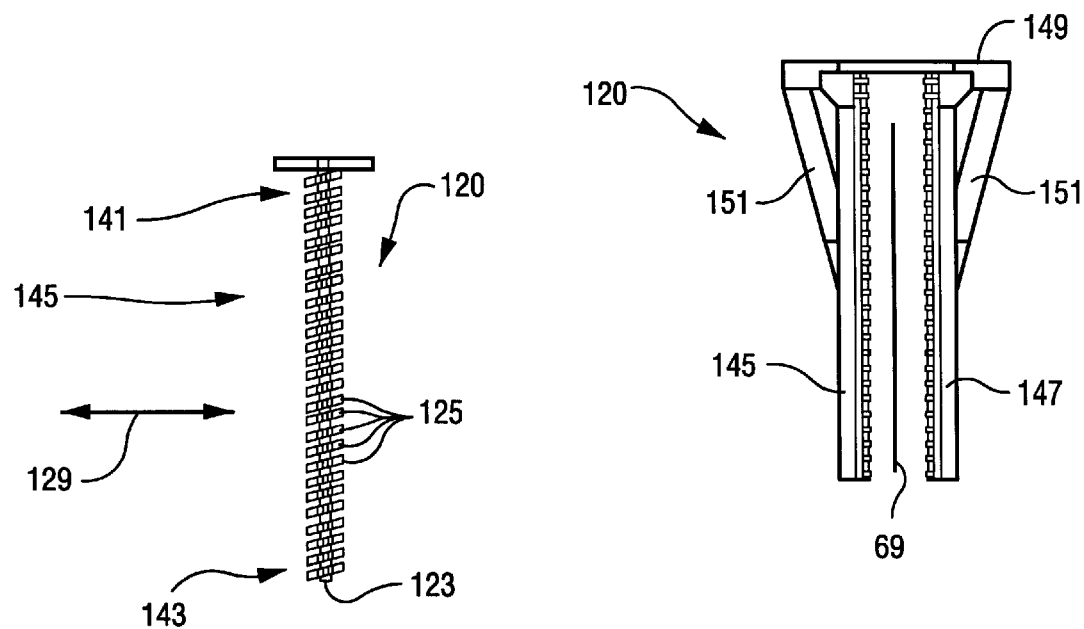
Fig. 16 (a)
Fig. 17 (a)

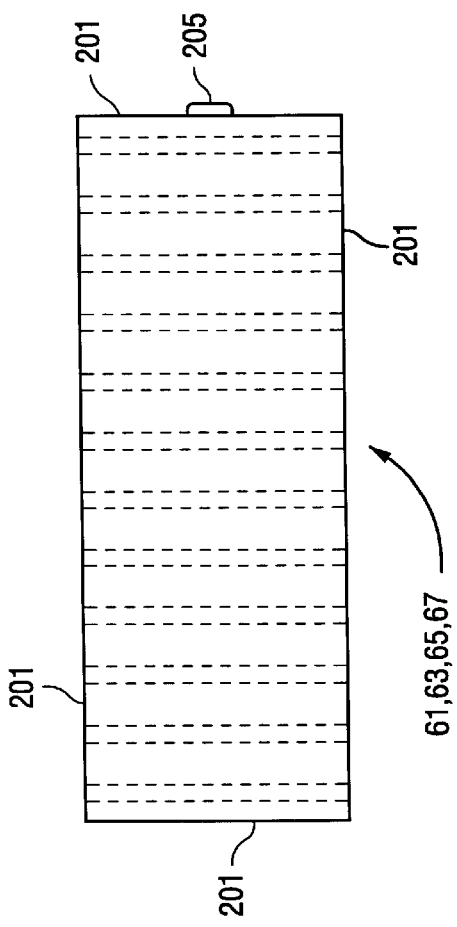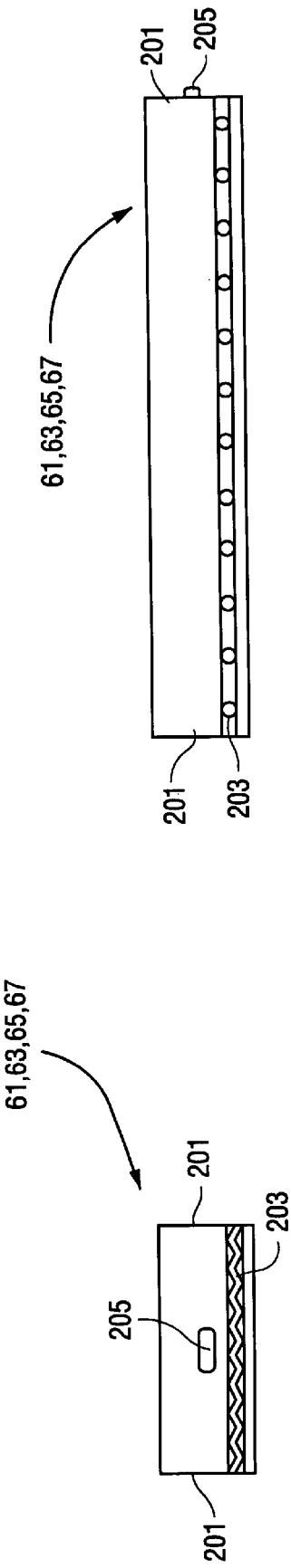

APPARATUS FOR WASHING CURVED SHEETS OF GLASS AND CORRESPONDING METHOD

This invention relates to an apparatus for cleaning sheets of glass, and a corresponding method. More particularly, this invention relates to such an apparatus where the sheets are curved and successively transported by a conveyor system through washing and/or drying zone(s).

BACKGROUND OF THE INVENTION

In conventional vehicle windshields, a plurality of curved glass sheets are adhered together via a plastic film such as polyvinyl butyral. Before being adhered, the glass sheets are often heated, bent and/or stacked in an adjacent or overlapping manner. In order to easily separate the sheets and/or to prevent sheets from fusing together during bending, diatomaceous earth powder and/or oxy powder is often sprinkled on or between the sheets. Before the polyvinyl butyral adhesion layer is inserted between the glass sheets, cleaning should be performed in order to remove the powder(s) from the sheet surfaces.

FIG. 1 is a side elevation view of a prior art glass washing (or cleaning) apparatus 3. The apparatus includes a frame having a plurality of upright support columns 5 connected to horizontal members 7, and a continuous conveyor adapted to support glass sheets 21 in a generally horizontal plane for movement from loading station 9, to wetting station 11, to scrubbing station 13, to rinsing station 15, to drying station 17, and finally to unloading station 19. Wetting station 11 includes a plurality of fixed nozzles 25 for discharging streams of cleansing liquid against the upper and lower surfaces of glass sheets 21. At scrubbing station 13, cleaning brushes 27 rotatingly contact sheets 21 in order to remove dirt therefrom. Sheets 21 are then rinsed at station 15 by a plurality of fixed spray nozzles 29, and thereafter are blown dry at station 17 by blowers 31. Additional details of the FIG. 1 apparatus may be found in U.S. Pat. No. 4,352,221, the disclosure of which is hereby incorporated herein by reference.

Unfortunately, it is undesirable to utilize cleaning brushes which contact the glass sheets. Because of the many different sized and shaped glass sheets that may be fed through such an apparatus, it would be time consuming, expensive and burdensome to be often changing brushes as a function of the sheets to be cleaned (different sized and/or shaped brushes may be needed for different shaped sheets). It is also undesirable to keep an inventory of many different brush types, most of which are not even used at the same time. Moreover, brushes may scratch the glass should dirt or other particles become lodged therein. Additionally, powder to be cleaned from the sheet may coagulate on brushes, resulting in frequent brush maintenance.

Another disadvantage associated with the apparatus of FIG. 1 is that it transports glass sheets through the various stations in a horizontal orientation. Conveyor rolls may be positioned between the glass surface to be cleaned and spray nozzles. This can prevent or inhibit liquid from the nozzles from impacting different points on is the glass.

It is apparent from the above that there exists a need in the art for an apparatus for cleaning (or washing) curved glass sheets, and a corresponding method, which solves one or more of the aforesaid problems and/or results in one or more of the following advantages: (i) elimination of contacting brushes; (ii) an improved system for cleaning glass sheets; (iii) a more efficient system for cleaning glass sheets; (iv) an improved system/method of drying glass sheets; and/or (v) a system which can transport single sheets of glass through a cleaning apparatus in a substantially upright manner.

It is a purpose of this invention to fulfill any or all of the above-identified needs in the art, as well as other needs which will become apparent to the skilled artisan from the following detailed description of this invention.

SUMMARY OF THE INVENTION

It is an object of this invention to provide an efficient apparatus for cleaning and/or drying curved sheets of glass, and a corresponding method for doing the same.

Another object of this invention is to provide a conveyor for transporting glass sheets through a cleaning system in a substantially upright manner.

Another object of this invention is to provide an apparatus and method for cleaning sheets of glass where no rotating brushes are required to substantially contact sheets to be cleaned.

Another object of this invention is to provide an apparatus and method for cleaning sheets of glass wherein a spray tool is maneuvered back and/or forth across a major glass surface to be cleaned so that the tool substantially tracks the sheet's curved contour.

Another object of this invention is to arrange spray nozzles relative to one another so that spray patterns from vertically adjacent nozzles overlap with regard to surface coverage, but do not substantially diffuse one another.

Another object of this invention is to provide a sheet conveyor that is not continuously operated during a cleaning process, but instead is indexed at predetermined intervals in order to move sheets of glass from one zone to the next after expiration of predetermined cycle(s) of wash/rinse time.

Yet another object of this invention is to satisfy any or all of the "objects" listed above.

Generally speaking, this invention fulfills any or all of the above describes needs or objects by providing a glass cleaning apparatus comprising:

a conveyor for moving a curved sheet of glass having a curved contour into a washing zone in a substantially upright orientation;

a first spray tool including a first array of nozzles for spraying a liquid toward the sheet of glass; and a first arm for moving the first spray tool in a curved path following the curved contour of the sheet of glass so that the first array of nozzles direct the liquid toward a first major surface of the glass sheet when the first spray tool is moving in the curved path.

This invention further fulfills any or all of the above described needs or objects by providing a method of cleaning a curved glass sheet having a curved contour, the method comprising the following steps:

moving the curved glass sheet into a washing zone;

providing a spray tool in the washing zone;

spraying a liquid toward the curved glass sheet via the spray tool; and moving the spray tool in a curved path following the curved contour of the glass sheet so that the spray tool directs liquid toward a first major surface of the glass sheet while the spray tool is moving in the curved path.

This invention further fulfills any or all of the above described needs or objects by providing a tool for cleaning a major surface of a glass sheet, the tool comprising:

an elongated support member adapted to be oriented in a substantially vertical manner across a first major surface of the glass sheet to be cleaned;

a plurality of nozzle mounts supported by the elongated support member, each of the nozzle mounts supporting first and second spray nozzles for spraying liquid toward the first major surface of the glass sheet; and wherein on a plurality of the nozzle mounts said first spray nozzle is located on one side of the elongated support member and the second spray nozzle is located on the other side of the elongated support member, and an axis or line drawn through the first and second spray nozzles defines an angle θ of from about 5–30 degrees with an axis perpendicular to a centerline or axis of the elongated support member, so that vertically adjacent spray patterns from vertically adjacent nozzles on a common side of the elongated support member do not substantially diffuse one another.

This invention further fulfills any or all of the above described needs or objects by providing an apparatus for removing liquid from a curved glass sheet having a contour, the apparatus comprising:

a conveyor for moving the curved glass sheet into a drying zone;

a drying tool including first and second elongated air knives thereon for simultaneously directing first and second respective sheets of air at opposite sides of the glass sheet in order to remove cleaning liquid from the glass sheet; and an arm for moving said drying tool in a curved path following the contour of the glass sheet so that the first air knife travels in a path along a first major surface of the glass sheet and directs its sheet of air toward the first major surface and the second air knife travels in a path along a second major surface of the glass sheet and directs its sheet of air toward the second major surface when the drying tool is moving in the curved path.

This invention further fulfills any or all of the above described needs or objects by providing a method of making a vehicle windshield comprising the steps of:

providing first and second glass sheets;

heating and bending the first and second glass sheets so that each bent sheet is curved;

loading the first bent glass sheet onto a conveyor;

moving the conveyor so that the first glass sheet moves into a zone of a glass cleaning apparatus;

providing a spray tool in the zone with first and second arrays of nozzles thereon for spraying liquid toward the glass sheet;

providing a substantial portion of the glass sheet between the first and second arrays of nozzles;

moving the spray tool in a curved path with the first array of nozzles directing liquid toward a first major surface of the glass sheet and the second array of nozzles directing liquid toward a second major surface of the glass sheet;

moving the first glass sheet on the conveyor out of the zone into a drying area and drying the first glass sheet;

removing the first glass sheet from the conveyor; and laminating the first and second bent glass sheets to one another, after at least the first sheet has been cleaned, to form a vehicle windshield.

This invention will now be described with respect to certain embodiments thereof, along with reference to the accompanying illustrations.

IN THE DRAWINGS

FIG. 9 is a top view of a portion of the FIG. 3–8 cleaning apparatus, illustrating robots in zone #s 2–4.

FIG. 10 is an end or front view of a glass supporting structure to be placed upon the conveyor according to the FIG. 3–9 embodiment of this invention, this structure including a generally horizontal slat supporting four upwardly extending members against which a glass sheet can lean during cleaning.

FIG. 11 is a side elevation view of the FIG. 10 structure.

FIG. 16(a) is a front view illustrating an array of the FIG. 13 spray nozzles on one leg of a tool to be manipulated by a robot in order to follow the contour of a curved glass sheet.

FIG. 16(b) is a top view illustrating a back and forth path along which a robot arm manipulates the spray tool of FIGS. 16(a) and 17(a) to follow the contour of the sheet.

FIG. 17(a) is a side elevation view illustrating a spray tool including nozzles of FIGS. 13–16(a) to be provided on either side of a glass sheet.

FIG. 23 is a front or end view of a liquid/water collection pan which may be provided in any of zone #s 1–4 according to any embodiment of this invention.

FIG. 24 is a top plan view of the water collection pan of FIG. 23.

FIG. 25 is a side elevation view of the water collection pan of FIGS. 23–24.

DETAILED DESCRIPTION OF CERTAIN EMBODIMENTS OF THIS INVENTION

Figure 1:
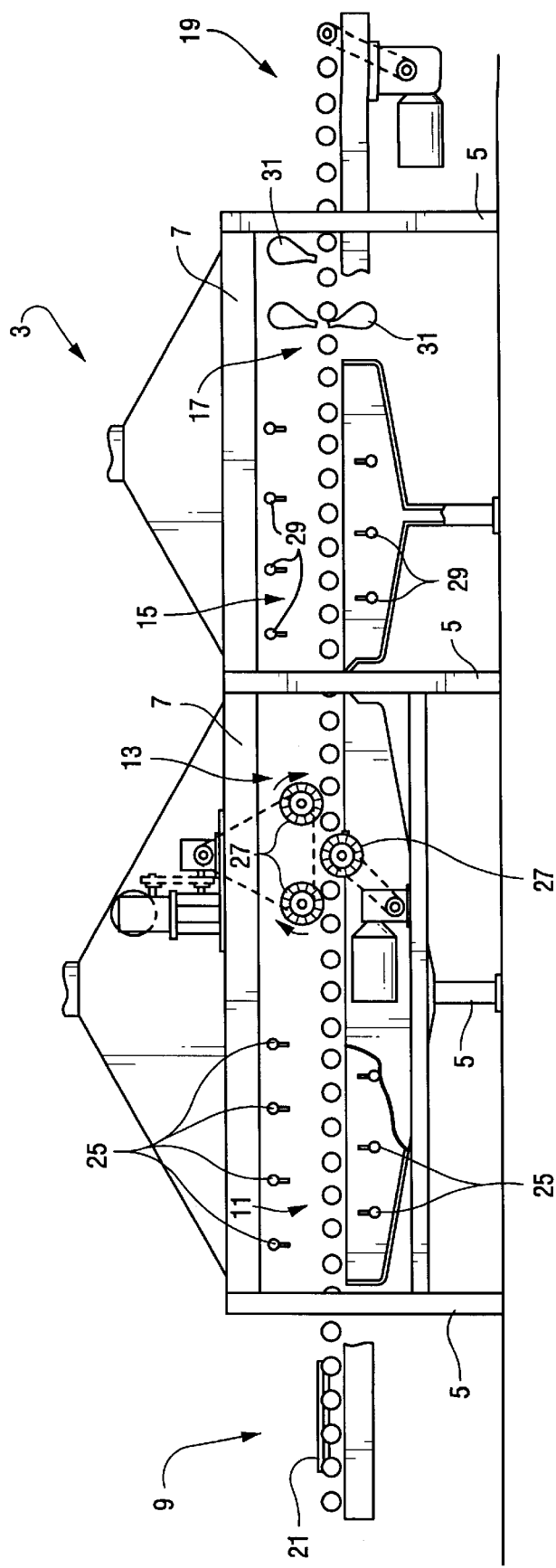
FIG. 1 is a side elevation view of a prior art apparatus for cleaning glass sheets.

Referring now more particularly to the accompanying drawings in which like reference numerals indicate like parts throughout the several views.

This invention relates to an apparatus, and corresponding method, for washing (i.e. cleaning) curved sheets of glass that are to be used in, for example, vehicle windshields. Other shaped glass sheets may also be washed according to different embodiments of this invention. Prior to describing particular embodiments of this invention, it is believed that a brief discussion of exemplary types of glass sheet which may be washed herein is appropriate.

Figure 2:
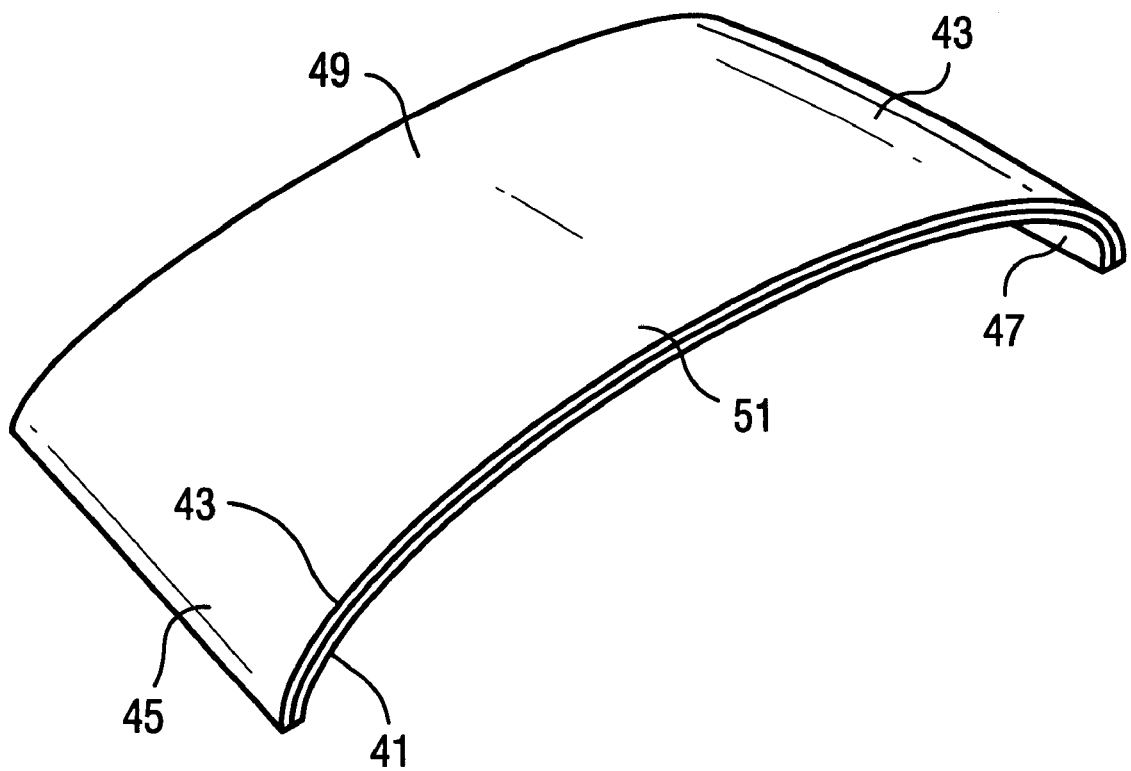
FIG. 2 is a perspective view of a safety glass according to an embodiment of this invention, wherein two curved glass sheets are laminated to one another to form a vehicle windshield.

FIG. 2 is a perspective view of a windshield 49, 51 including two curved/bent sheets of glass 41 and 43 laminated to one another. Sheets 41 and 43 are adhered to one another by an intermediate layer of a material such as polyvinyl butyl. Each glass sheet 41, 43 has first and second opposing three dimensional major surfaces curved along X, Y, and Z axes, with each major surface defining a contour. In certain embodiments, wing portions 45 and 47 of each sheet are bent relative to the central portion. An intermediate portion from wing 45 to wing 47 may be curved/bent in a convex manner.

Figure 31:
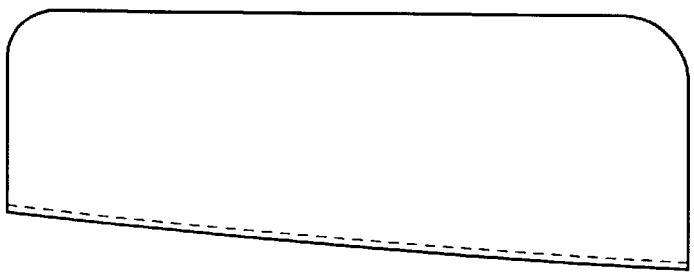
FIG. 31 is a side view of the glass sheet of FIGS. 29–30.
Figure 29:
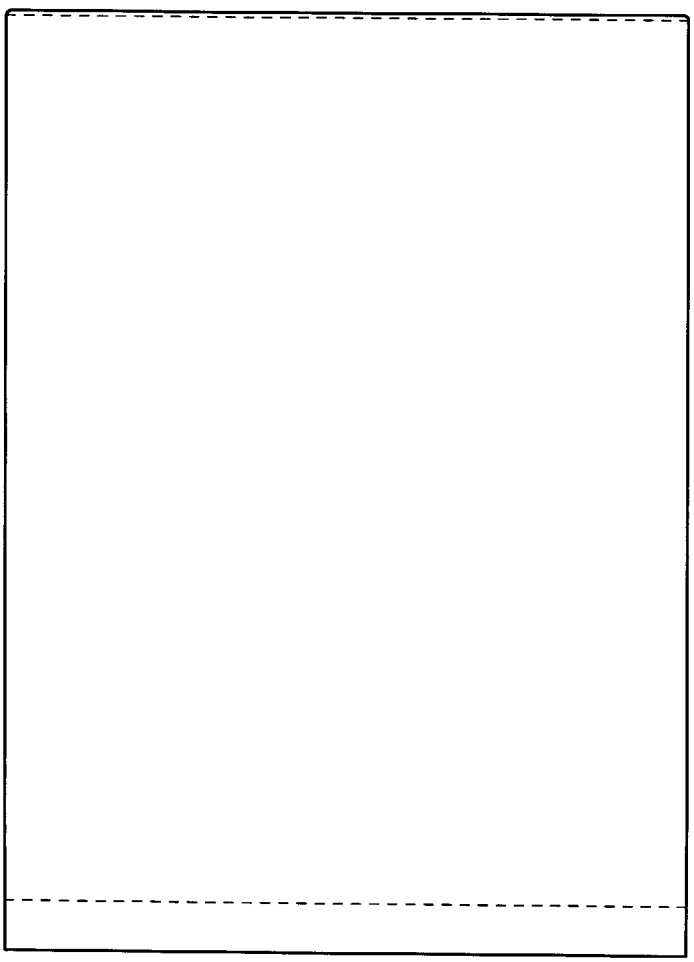
FIG. 29 is a front view of a curved/bent glass sheet (i.e. a half-windshield sheet) which may be conveyed through and cleaned by the apparatus of any embodiment of this invention.
Figure 30:
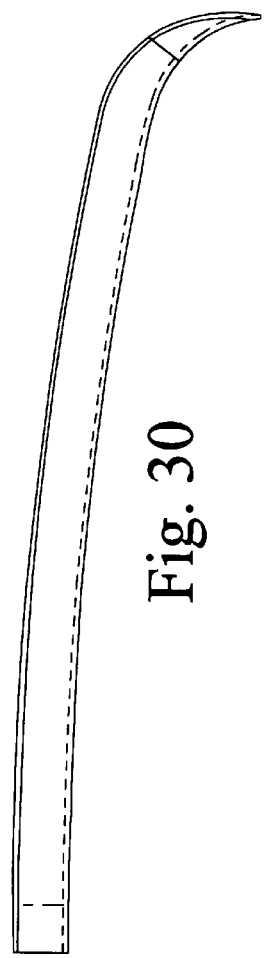
FIG. 30 is a top view of the glass sheet of FIG. 29.
Figure 34:
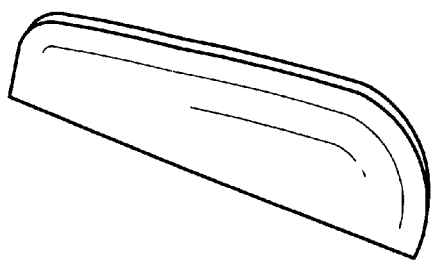
FIG. 34 is a side view of the glass sheet of FIGS. 32–33.
Figure 32:
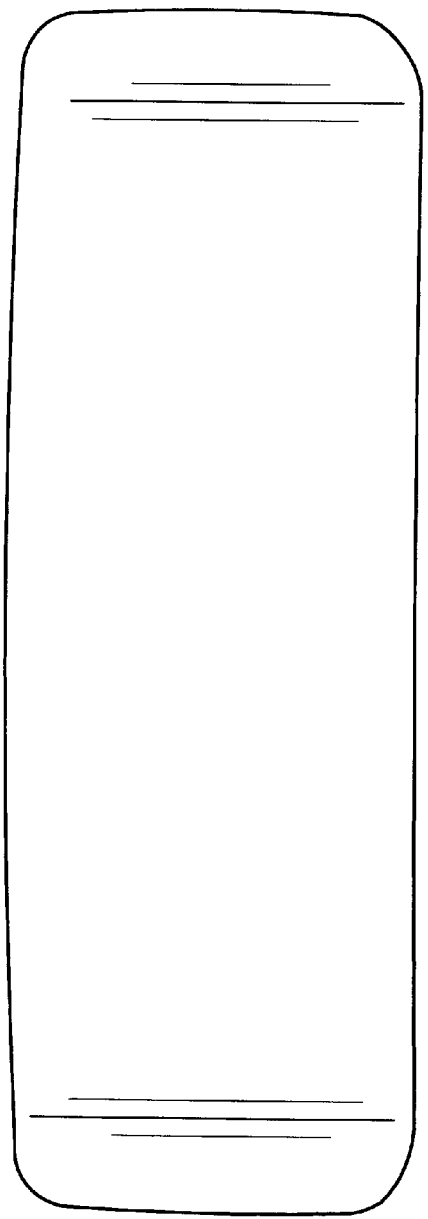
FIG. 32 is a front view of a curved/bent glass sheet that may be conveyed through and cleaned by the apparatus of any embodiment of this invention.
Figure 33:
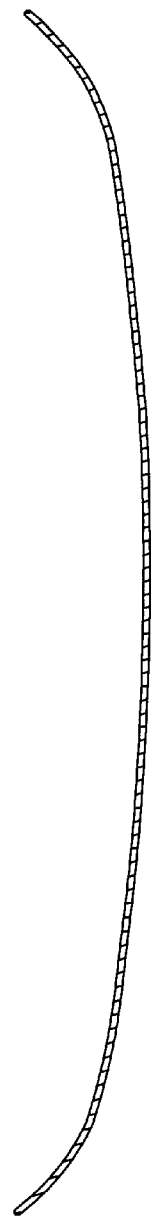
FIG. 33 is a top cross-sectional view of the glass sheet of FIG. 32.

The apparatus for cleaning/washing glass sheets, to be described below and illustrated herein, is adapted to wash/clean curved glass sheets 41 and 43 individually, before they are laminated to one another. In a similar manner, cleaning apparatuses herein may clean curved glass sheets as shown in FIGS. 29–31, or curved glass sheets as shown in FIGS. 32–34. Virtually, all curved glass sheets shaped in a manner adapted for vehicle windshield applications may be cleaned/washed by apparatuses described herein. It is preferable that glass sheets to be washed do not include bends greater than about 90° defined therein. While certain embodiments of this invention are particularly adapted for cleaning curved glass sheets, it is recognized that substantially planar sheets may also be cleaned herein.

Figure 3:
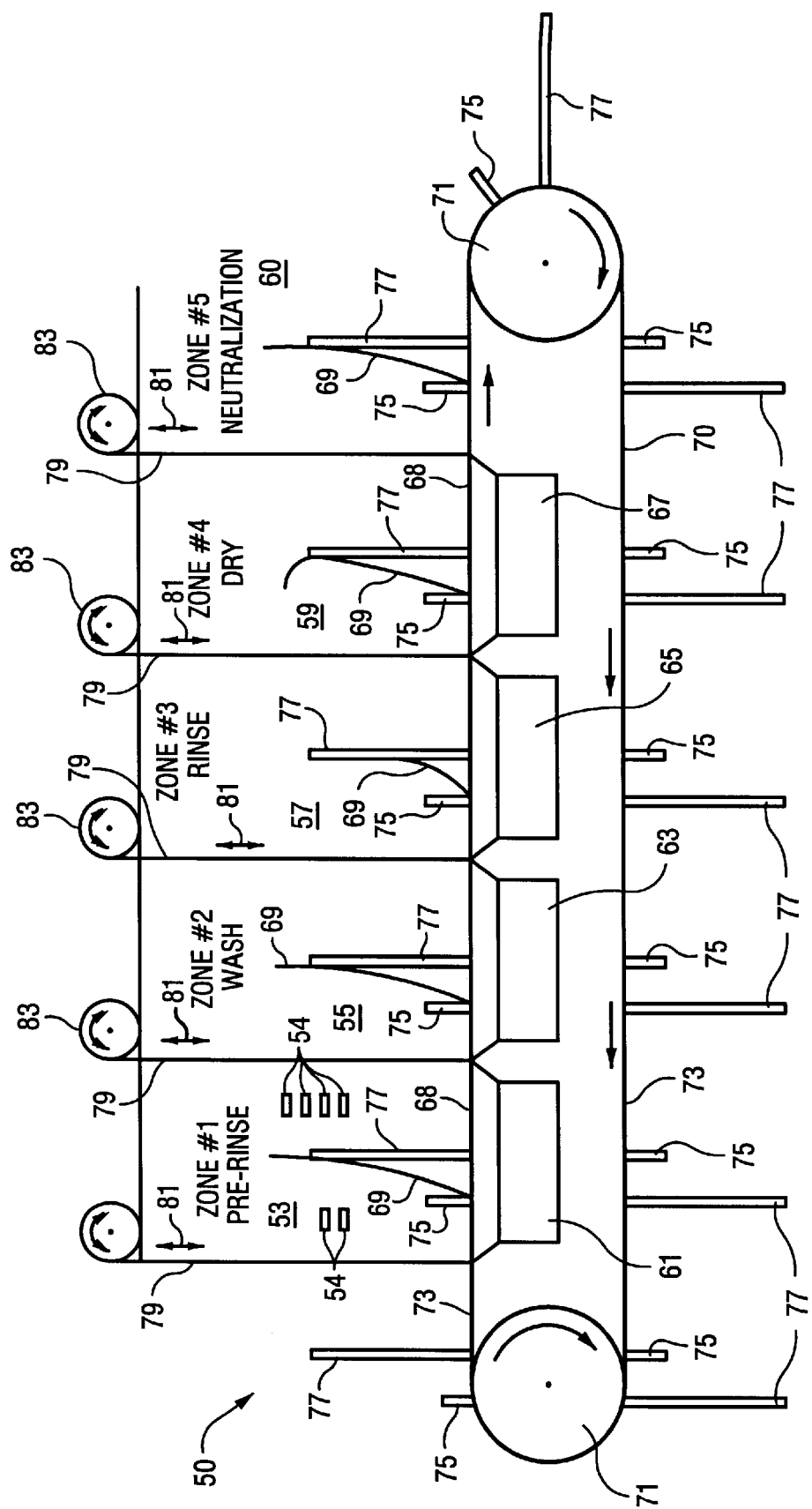
FIG. 3 is a side elevation view of a portion of an apparatus for cleaning curved glass sheets according to an embodiment of this invention.

FIG. 3 generally illustrates portions of a glass cleaning/washing apparatus according to an embodiment of this invention. The apparatus includes pre-rinse zone #1 (referred to by reference numeral 53), wash zone #2 (referred to by reference numeral 55,) rinse zone #3 (referred to by reference numeral 57), drying zone #4 (referred to by reference numeral 59) and neutralizing or cooling zone #5 (referred to by reference numeral 60). Each of zone #s 1–4 (i.e. 53–59) may include a water collecting pan or reservoir 61, 63, 65, 67, located at a bottom portion thereof.

The conveyor 68 for indexing curved/bent glass sheets 69 through the apparatus includes rotating sprockets 71, which either alone or in combination drive a pair of continuous elongated chains 73 which are laterally spaced from one another. In certain embodiments, two such sprockets 71 are provided at each end of the conveyor, for a total of four (two sprockets per chain 73). At least one of sprockets 71 is driven by a servo motor 91 (see FIG. 4) or the like, so that chains 73, and thus glass sheets 69, may be indexed from one zone to the next during the process. A plurality of upwardly extending glass supporting pins or pegs 75, 77 are supported by the parallel chains 73. Glass sheets 69 may be positioned between adjacent supporting pins 75, 77 in a substantially upright orientation (i.e. sheets 69 are oriented on the conveyor with a substantial portion of the sheet in a vertical orientation plus/minus about 30 degrees, e.g. as shown in FIG. 3). The pins function to retain the sheets during the cleaning process.

Generally speaking, when a curved glass sheet 69 is placed on the conveyor between support pins, at least two sprockets 71 are driven and the conveyor indexed to transport sheet 69 from loading area 50 into zone #1 (53). When sheet 69 reaches approximately the center of the zone #1 area 53, the conveyor is stopped and retractable walls 79 between adjacent zones are closed. Walls 79 move in direction 81. A predetermined cycle time (e.g. from about 15–60 seconds, preferably from about 20–50 seconds, and most preferably about 40 seconds), dictated by a timer or counter in the controller, is begun shortly after walls 79 are closed in certain embodiments. Glass sheet 69 remains stationary in zone #1 while a plurality of fixed spray nozzles 54 (positioned on all sides of the sheet, including on the sidewalls) wet or pre-rinse sheet 69 with water or any other type of cleansing liquid heated to a temperature of from about 120 to 200 degrees F (preferably about 150 degrees F). Water falling into pan 61 in zone #1 is preferably recycled and used again to pre-rinse other sheets in this zone.

Following the cycle time, walls 79 are lifted and at least one sprocket 71 is again driven to move the first sheet from zone #1 into zone #2 (55). When the first sheet 69 is moved from zone #1 into zone #2, another or second sheet 69 may simultaneously be moved from loading area 50 into zone #1. The conveyor then stops allowing the first sheet to be stationary within zone #2 and the second sheet to be stationary in zone #1, and walls 79 are again lowered to isolate the adjacent zones from one another. In zone #2, a robot arm manipulates a plurality of spray nozzles across the two major surfaces of the sheet, in a back and forth manner for approximately the same cycle time, in order to clean dirt/powder off of the sheet, while the zone #1 wetting process described above is repeated for the second sheet now in that zone. In zone #2, the nozzles may spray sheet 69 with water, or alternatively with a combination of water and an RO solution, heated to a temperature of from about 120 to 200 degrees F, preferably about 140 degrees F, and under a spray pressure of from about 50 to 90 psi (preferably about 60 psi). This combination may be monitored by a water sensor system in pan 63, in order to maintain a predetermined level of conductivity of the washing liquid. Over-flow from zone #2 collected in pan 63 may be transferred for use in zone #1 in certain embodiments.

When the cycle time has expired, spraying stops in zone #1 and zone #2, walls 79 are raised, and the conveyor is again indexed forward so that the first glass sheet is moved from zone #2 into zone #3, the second glass sheet is moved form zone #1 into zone #2, and a third glass sheet to be cleaned is moved from loading area 50 into zone #1. The conveyor is then stopped, and walls 79 lowered when the sheets are in approximately the centers of their respective zones. The sheet in zone #3 is rinsed in a manner similar to the process performed in zone #2, with a robot manipulating a plurality of spray nozzles across each of the major surfaces of the glass sheet in a back and forth manner. The rinsing in zone #3 may be performed with water. In other embodiments, such rinsing may be performed with RO water (e.g. substantially free of certain minerals as known in the art) to achieve a more efficient rinsing/cleaning. The rinsing liquid in zone #3 may be heated to a temperature of from about 75 to 120 degrees F, most preferably about 80 degrees F. Run-off from zone #3 is collected in pan 65 and may be pumped to a holding tank to be used as make-up for the washing zone in certain embodiments. While the rinsing process is being performed in zone #3, the previously described pre-rinsing and washing processes are being performed in zone #s 1 and 2, respectively, for the sheets therein. After the cycle time, all spraying stops and walls 79 are again lifted and the conveyor driven so that the first glass sheet is indexed or moved into zone #4, with each of the following sheets also being moved forward into the next zone. When the first sheet reaches a central area in zone #4, the conveyor stops and walls 79 are again lowered. In zone #4, a robot manipulates air blowing knives across the contour of the two major sheet surfaces to remove residual water from the sheet (i.e. to dry off the sheet), while the aforesaid pre-rinsing, washing and rinsing processes are performed in zone #s 1, 2, and 3, respectively. When the cycle time is over, walls 79 are lifted and the conveyor is driven to move the first sheet out of zone #4 and into neutralization zone #5 where the sheet is permitted to cool. The other sheets on the conveyor are also moved forward one zone. After a sheet cools in zone #5, it may lifted from the conveyor and laid down in a generally horizontal orientation on another conveyor or the like for transport to a lamination station. New sheets 69 may be continuously loaded onto the conveyor at 50, and the above-described steps repeated.

The embodiment described above and shown herein provides only a single sheet 69 in a zone at a time. However, it is recognized that in alternative embodiments multiple sheets 69 may be provided in a single zone for pre-rinsing, washing, rinsing, and/or drying.

Most water or other rinsing/washing liquid sprayed by the nozzles in zone #s 1–3 falls from the glass sheets 69 and collects in pans (or reservoirs) 61, 63 and 65 which are located at the bottom of each zone, respectively. Each of the pans is located beneath upper portion 68 of the conveyor. These reservoirs enable liquid(s) to be filtered and recirculated for re-use in certain embodiments. Any residual water washed off in zone #4 collects in reservoir or pan 67 located at the bottom of the zone. Water from reservoir 67 may also be recirculated for re-use in any of zone #1 1–3 in certain embodiments. Additionally, it is noted that water and/or RO tanks (not shown) are provided proximate zone #s 1–3, so that liquid from the tanks can be forwarded to the respective spray nozzles for application on the sheets passing through the apparatus.

Parallel chains 73 of the conveyor are continuous, in that each wraps around a pair of spaced sprockets 71. Thus, after a glass sheet is removed from the conveyor at zone #5, the supporting pins 75, 77 which held the sheet are periodically indexed around the sprocket 71 proximate the unloading zone, along the underside 70 of the conveyor, and back to loading zone 50, in a non-continuous manner where conveyor movement is interrupted by stationary periods during running of the cycle time(s). Once back to loading area 50, another sheet 69 to be cleaned can be placed between the pins.

Still referring to FIG. 3, zone #s 1–5 are partitioned or isolated from one another by vertically upstanding walls 79. Sidewalls are also provided in each of zone #s 1–4 to close the sides thereof. Roof structure may or may not be provided in each zone in different embodiments. Partition walls 79 prevent water or spray from traveling from one zone into an adjacent zone. Exemplary roll up doors/walls 79 may be obtained from Rytec Corp., Jackson, Wis., under the "Predadoor" name.

In certain preferred embodiments of this invention, each wall 79 is a roll-up wall which may be selectively raised and lowered 81 in order to allow glass sheets to move from one zone to the next. In other words, each of the roll-up walls 79 is in a lowered or "down" position, as shown in FIG. 3, during the cycle time when the glass sheets are washed/dried. However, at the end of each cycle, each wall 79 is simultaneously raised by a motor 83. Motor 83 may, in certain embodiments, be a 1.0/5.0 HP, 3 ph, 60 Hz dual speed electric motor with brake, and can cause a wall/door travel speed of from about 10 to 42 inches per second. After walls 79 have been raised, the conveyor is started in order to move the respective glass sheets 69 from one zone (e.g. zone #2) into the next zone (e.g. zone #3) underneath of the raised walls 79. After the sheets have been moved by the conveyor into the next zone, walls 79 are rolled downwardly to isolate each zone from adjacent zone(s). Thereafter, once the cycle time begins, the robots maneuver the spray nozzles and/or air knives along the contour of the respective glass sheets as will be described in more detail hereinafter. In certain embodiments, photo-eye(s) may be provided adjacent each door 79 to make sure that the conveyor does not start to move glass sheets until all walls 79 are in a raised position.

Figure 4:
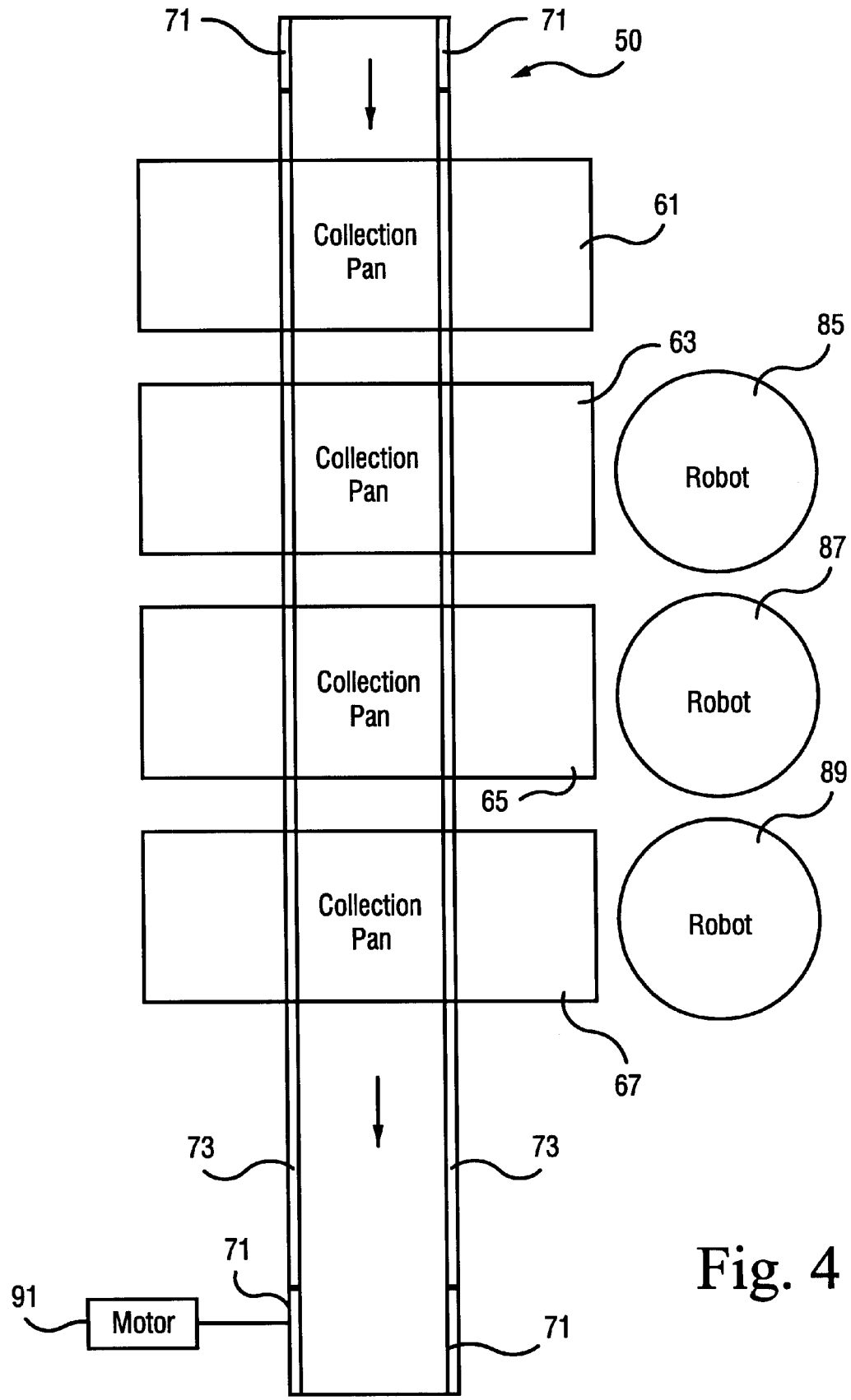
FIG. 4 is a schematic view illustrating a portion of the cleaning apparatus of FIG. 3.

FIG. 4 is a schematic top view of a portion of the cleaning/washing apparatus of FIG. 3. As shown in FIG. 4, robot 85 is provided for manipulation of spray nozzles in zone #2, robot 87 for manipulation of spray nozzles in zone #3, and robot 89 for manipulation of air knives in zone #4. Servo motor 91 selectively drives a pair of sprockets 71 at the unloading end of the conveyor, in order to selectively drive or index the conveyor and the glass sheets thereon. In certain embodiments, robots 85, 87 and 89 may be obtained from Fanuc, Auburn Hills, Mich.

Figure 5:
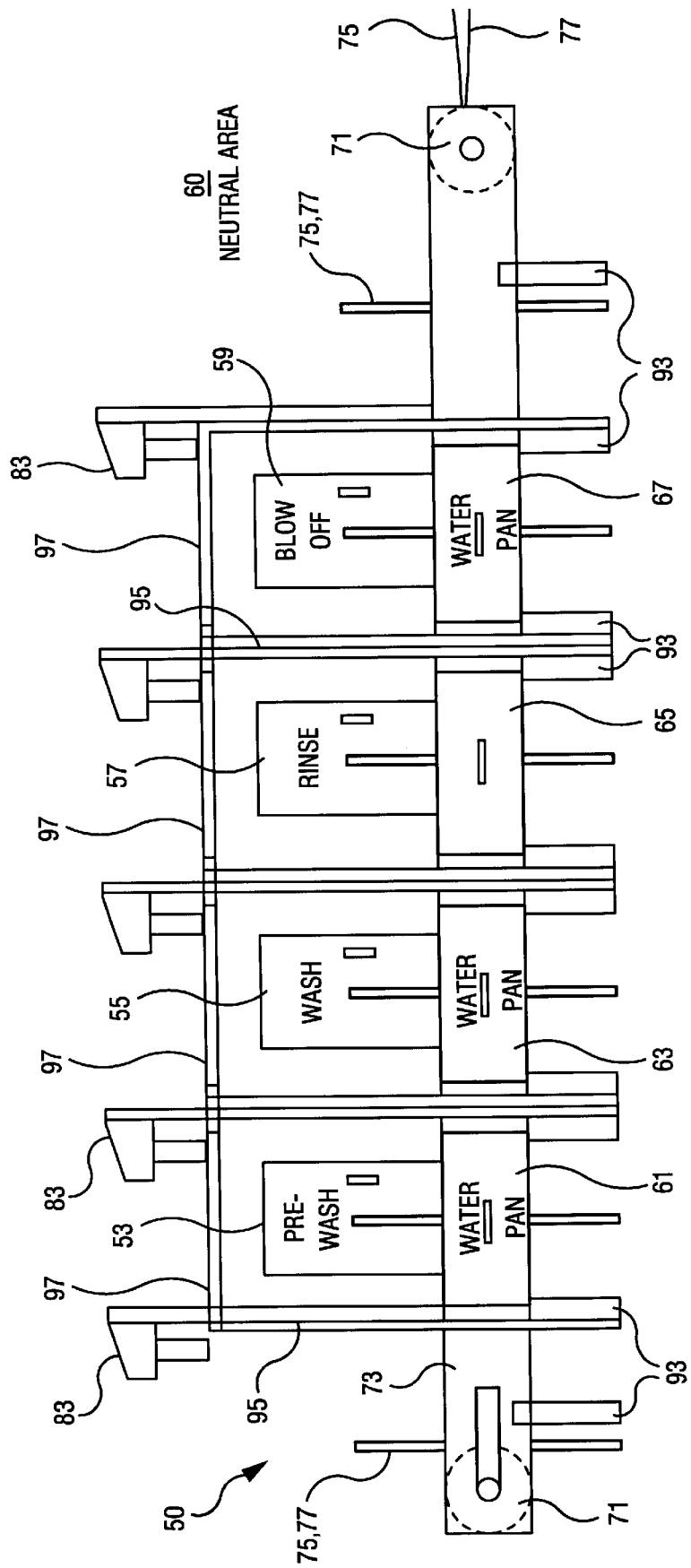
FIG. 5 is a side elevation view illustrating a portion of the cleaning apparatus of the FIG. 3–4 embodiment.

FIG. 5 is a side elevation view of a portion of the cleaning/washing apparatus of FIGS. 3–4. In addition to the elements shown in FIGS. 3–4, FIG. 5 further illustrates vertically oriented conveyor support members 93 and apparatus frame including vertical members 95 and horizontal members 97. Glass support pins 75 and 77 may be of approximately equal height. Alternatively, one pin (e.g. 77) may be substantially taller or longer than an adjacent pin (e.g. 75), as shown in the FIG. 3 embodiment.

Figure 6:
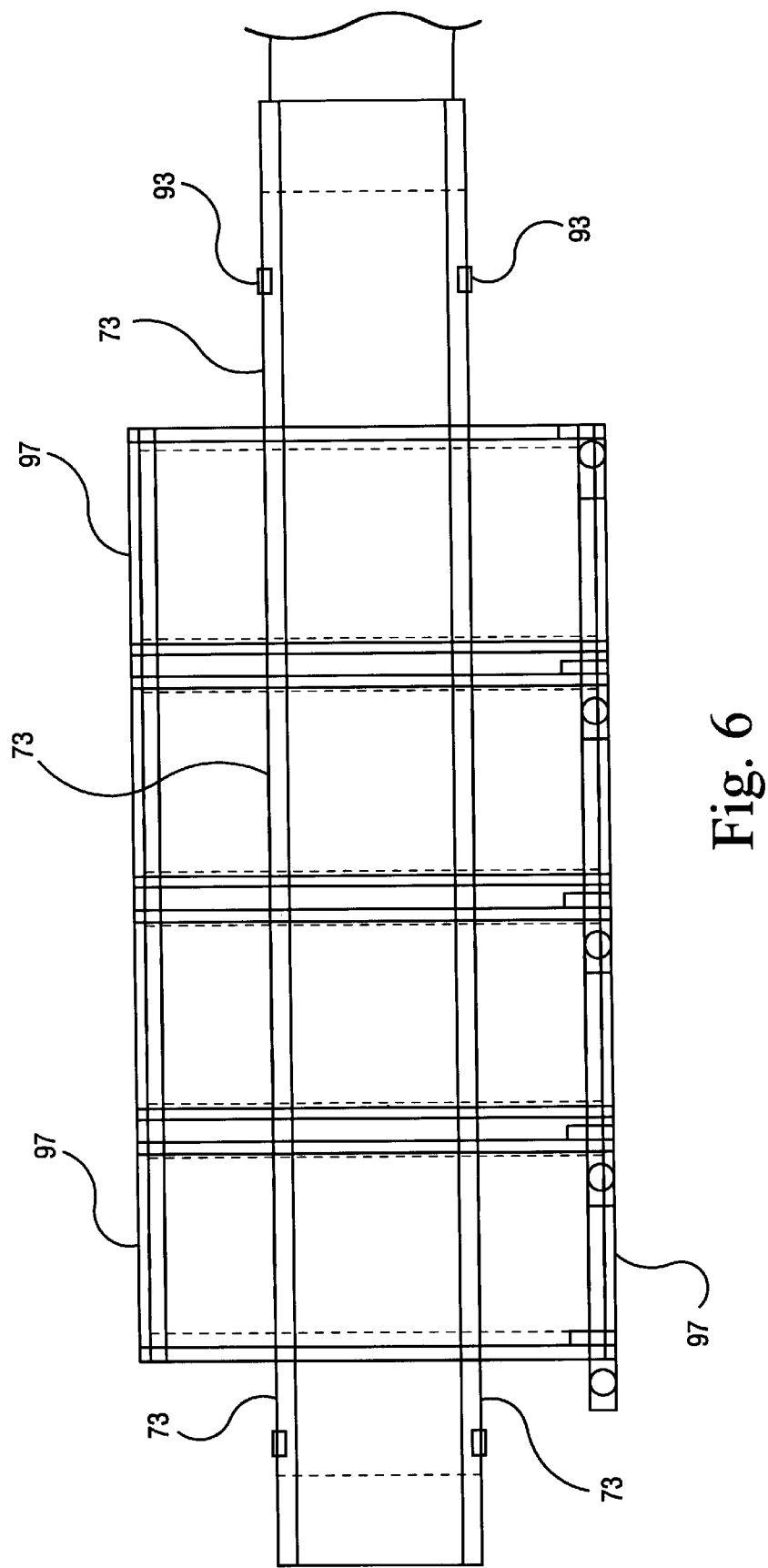
FIG. 6 is a top plan view illustrating the apparatus of FIG. 5.
Figure 7:
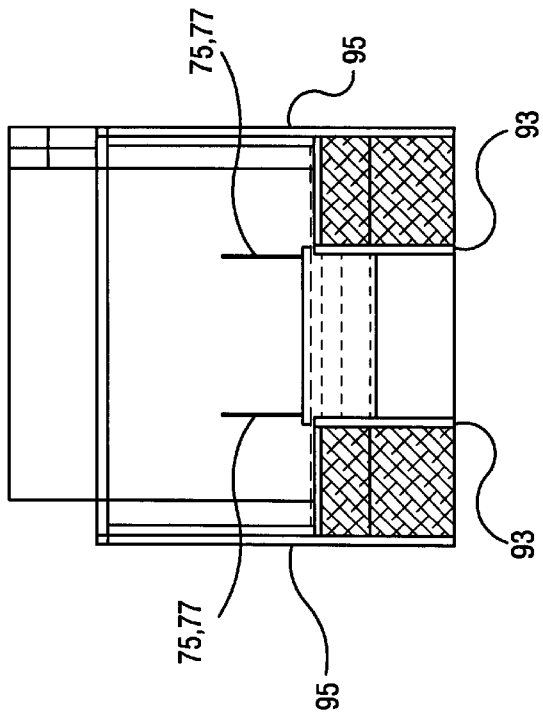
FIG. 7 is an end view looking into the loading end of the apparatus of FIGS. 5–6.

FIG. 6 is a top view of the washing/cleaning apparatus shown in FIG. 5, absent glass supporting pins and other structure for purposes of simplicity. Meanwhile, FIG. 7 is a front or end view of the apparatus of FIGS. 5–6, when viewed from the loading end of the conveyor.

Figure 8:
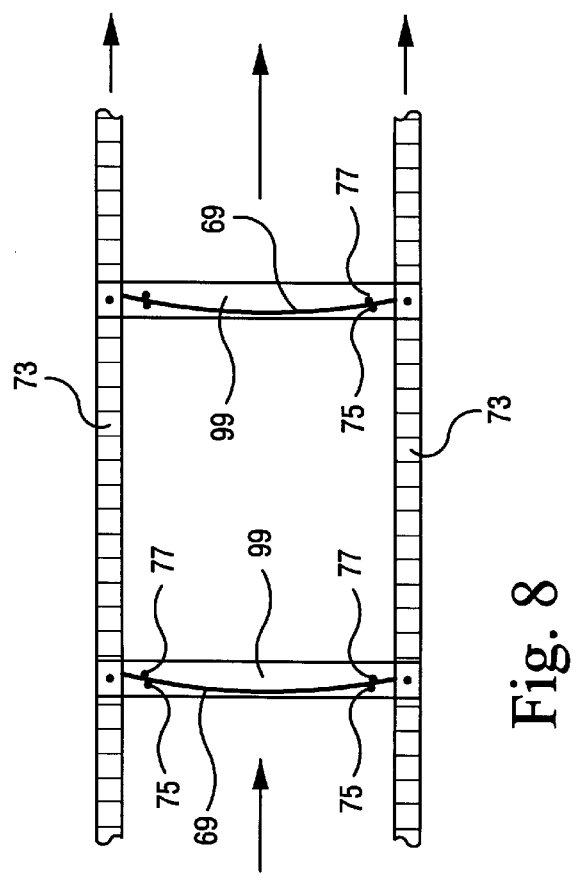
FIG. 8 is a top view illustrating a portion of the conveyor chains and slat support members extending therebetween according to the FIG. 3–7 embodiment.

FIG. 8 is a top view of a portion of the conveyor of the FIG. 3–7 apparatus, including pin supporting slats 99 which are connected to and extend between conveyor chains 73, and glass supporting pins 75, 77. Chains 73 are spaced from one another by from about 40 to 60 inches in certain embodiments, most preferably by about 48 inches. In certain embodiments, each chain 73 may have a pitch of about 1.5 inches, and weigh about 3.6 pounds per foot, for a total weight of about 468 pounds. In certain embodiments, a total of 52 supporting pins 75, 77 may be provided on the conveyor (four per sheet 69), each pin weighing about 1.34 pounds.

As shown in FIG. 8, a curved glass sheet 69 may be positioned above each slat 99, with each end of the sheet positioned between a pair of removable pins 75, 77. The position of pins 75, 77 may be adjustable along the length of each supporting slat 99 so as to accommodate different sized sheets of glass. Pins 75, 77 function to support glass sheets during the washing/cleaning process, and prevent them from moving to any significant degree. Pins 75, 77 are strong enough so that they can withstand the force placed upon the glass sheets 69 due to the high pressure spray emitted from the washing/rinsing nozzles. It is noted that the convex side of each glass sheet 69 may rest against either pin 75, or pin 77. However, it is preferable for each sheet 69 to lean against a tall peg or pin 77 towards the direction of conveyor flow, and for the bottom of each sheet 69 to rest against a shorter peg or pin 75, to allow easier access to load. In certain embodiments, slats 99 may be positioned along the conveyor chains at approximately five foot intervals, with a total of thirteen slats being used on the conveyor at a given time, so that each time the conveyor is indexed, it moves approximately five feet and sheets 69 are moved from one zone to the next.

FIG. 9 is a top view of a portion of the washing/cleaning apparatus of FIGS. 3–8, specifically illustrating the provision of robots 85, 87, and 89, in zone #s 2–4, respectively. No robot is provided in zone #1 in certain embodiments, but it is recognized that the same robot and nozzles provided in either of zone #s 2–3 may also be provided in zone #1 in alternative embodiments. Each robot 85, 87 and 89 includes an upstanding base portion 107 as well as a manipulatable arm 109 connected thereto. Each arm 109 preferably extends or is located at an elevation above the respective glass sheets 69 in the corresponding zone. Attached to each robot arm 109 is a tool (e.g. including an array of spray nozzles or multiple air knives) which is adapted to straddle a glass sheet 69 in the corresponding zone and be manipulated back and forth along the two opposing major sheet surfaces. A robot (not shown) may also be provided at loading zone 50 for placing sheets 69 on the conveyor, and a robot may be provided at the unloading area adjacent zone #5 for unloading cleaned sheets 69 from the conveyor and placing them on another conveyor, in certain embodiments.

Figure 12:
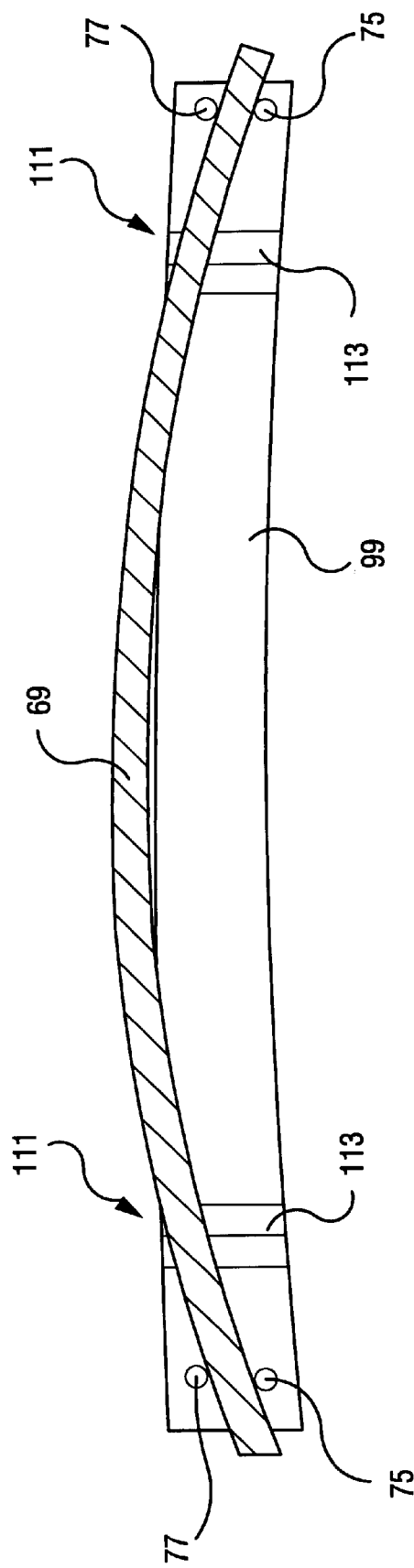
FIG. 12 is a top elevation view of the FIG. 10–11 structure, and further with a glass sheet shown in cross-section.

FIGS. 10–12 illustrate an exemplary glass supporting structure to be connected to chains 73 according to an embodiment of this invention. Horizontally aligned supporting slat 99 extends between and is operatively connected to the two chains 73. One end of slat 99 is affixed to one chain and the other end of the slat to the other chain. Slat 99 supports two or more pins 75, 77, as well as at least two triangular shaped glass supporting members 111. A plurality of slats 99 are provided in spaced relation along the conveyor, with a different slat adapted to be in each zone during a given cyclic period so as to enable one sheet 69 to be in zone #1, while another is in zone #2, another in zone #3, another in zone #4, and another in zone #5.

In the particular embodiment shown in FIGS. 10–12, each end of slat 99 supports a pair of elongated upstanding support pins 75, 77 which extend upwardly therefrom. Pins 75,77 may be circular in cross section as shown in the drawings, or alternatively may have an oval, square, rectangular, or triangular cross section in other embodiments. In certain embodiments, each pin 75, 77 may be from about 10 to 40 inches in length, more preferably from about 12 to 36 inches in length. Alternatively, pins/posts 77 may be of the lengths described above (e.g. 36 inches tall), while the opposing pins/posts 75 are of a shorter length (as shown in FIG. 3) of from about 2 to 15 inches, more preferably about 12 inches, so that shorter pins 75 do not interfere with spray from nozzles and enable ease of sheet loading. Exemplary adjacent half inch diameter pins 75, 77 may have a center to center distance of from about 1.0 to 4.0 inches, most preferably about 1.5 inches, in certain embodiments.

FIG. 12 illustrates sheet 69 in a cross sectional manner, supported by pins 75, 77 and members 111. Sheet 69, proximate each opposing end thereof, extends between and is supported by a pair of pins or pegs 75, 77. The bottom edge of sheet 69 rests upon support members 111 at apex 113 thereof, so as to prevent the bottom edge of the sheet from contacting either the conveyor chains or slat 99. Glass support members 111 may be made of or include UHMW or Teflon™, or any other suitable non-marking material that will support sheets 69 and tend not to scratch or otherwise damage them.

In certain embodiments, pins 75, 77 may be removably connected at their bottom portions to a slat 99. However, in other embodiments, the pins may be directly connected to a chain 73, or any other supporting structure of the conveyor. In other embodiments, the conveyor need not utilize chains, but instead may be provided with a continuous or semi-continuous web upon which pins 75, 77 may be mounted or supported.

The FIG. 10–12 embodiment illustrates all four pins 75, 77 supported by a single slat 99. However, in other embodiments, pins 75 may be mounted on a first slat while adjacent pins 77 are mounted on a second slat that is positioned proximate or adjacent the first slat.

Slat 99 is shown in FIGS. 10–12 as being approximately planar in shape. However, it is noted that slats herein may take different shapes and may be, for example, tubular, flat, round, or the like. In certain embodiments, slats 99 are of a piece of elongated box tubing. In certain preferred embodiments, slat 99 as well as elongated pins 75, 77 are made of or include stainless steel, although other materials may instead be used.

Figure 13:
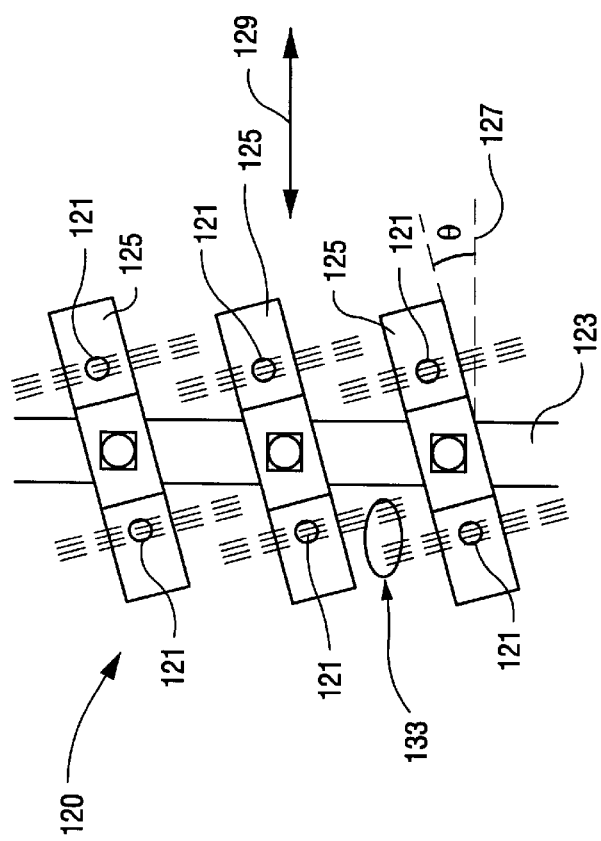
FIG. 13 is a front view of a plurality of spray nozzles provided in the washing zone (i.e. zone #2) of the apparatus of FIGS. 3–12, these nozzles for directing cleaning liquid toward and against the surface of a glass sheet to be cleaned.

FIG. 13 illustrates a portion of tool 120 including spray nozzles 121 affixed to vertical elongated support member 123. FIG. 16(a) is a front elevation view of one leg of tool 120. Tool 120 is preferably used as a glass washing tool and to be attached to a robot arm 109 in zone #2, but may also be used in other zones herein such as zone #s 1 and/or 3 in certain embodiments. As shown in these two figures, cross-members or nozzle mounts 125, each of which supports a pair of nozzles 121, are arranged at an angle θ relative to an imaginary line 127 drawn perpendicular to the axis of member 123 (i.e. relative to horizontal line 127). Angle θ is preferably from about 5°–30°, more preferably from about 10°–20°, and most preferably about 15°. Members 125 are angled so that the spray from vertically adjacent nozzles 121 overlaps 133 as tool 120 is manipulated back and forth in directions 129. This angling further permits a single bracket 125 to be utilized to support two nozzles 121, one on each side of elongated support 123.

Another way of describing the angling of the pair of nozzles 121 on each member 125 is as follows. An axis or line drawn through the first and second spray nozzles 121 on a supporting member 125 defines an angle θ of from about 5–30 degrees (more preferably from about 10–20 degrees, and most preferably about 15 degrees) with an axis 127 perpendicular to a centerline or axis of elongated support member 123, so that vertically adjacent spray patterns from vertically adjacent nozzles do not substantially diffuse one another, but do overlap from a side viewpoint as shown at 133 (see FIGS. 13–14).

Exemplary nozzles for tool 120 in zone #2 in certain embodiments may be obtained from Spray Systems Co., of Michigan, and may be ¼ inch NPT FlatJet 3510 high impact nozzles (specified to about 1.0 GPM @ 40 psi). Exemplary nozzles for tool 120 in zone #3 are QJJ 6506 VeeJet nozzle tips (specified to 0.6 GPM @ 40 psi) available from Spray Systems. Operating capacity for the nozzles may be from about 0.20 to 2.0 GPM @ 5 to 300 psi in certain embodiments. Spraying liquid may be supplied to the nozzle tools 120 by way of centrifugal pump(s) of the like, via conduit(s), as is known in the art.

Figure 14:
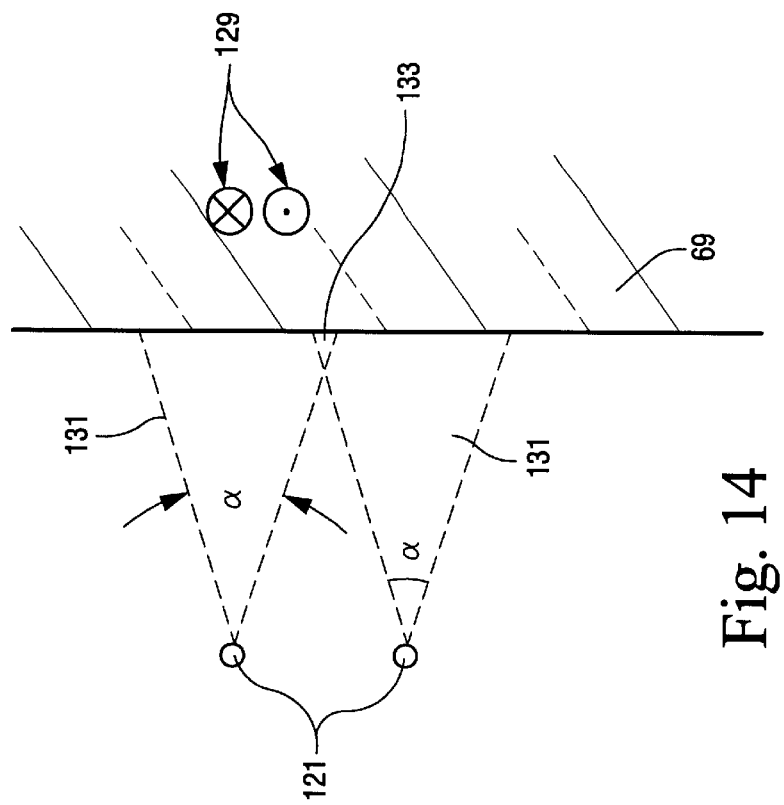
FIG. 14 is a side elevation view of two of the vertically spaced FIG. 13 nozzles directing overlapping spray patterns toward the surface of a glass sheet.

FIG. 14 is a side elevational view illustrating liquid spray 131 from a pair of vertically adjacent nozzles 121 directed against a major surface of glass sheet 69. The nozzles of FIG. 14 are vertically spaced and on the same side of support 123 in FIG. 13. Referring to FIGS. 13–14, the cocking of members 125 at an angle θ causes spray patterns 131 to overlap 133. However, while spray patterns 131 overlap, they do not interfere with one another (i.e. no significant diffusion) because they are spaced from one another laterally in the area of overlap 133 as shown in FIG. 13.

Referring to FIG. 14, tool 120 and thus nozzles 121 are manipulated by a robot arm 109 in and out of the page (129) in order to follow and clean the surface of sheet 69. In the particular embodiment shown in FIGS. 13–15, each spray pattern 131 expands to or defines an angle α of from about 25°–45°, preferably from about 30°–40°, and most preferably about 35°. This spray angle has been found to be ideal for washing to be performed in zone #2.

Figure 15:
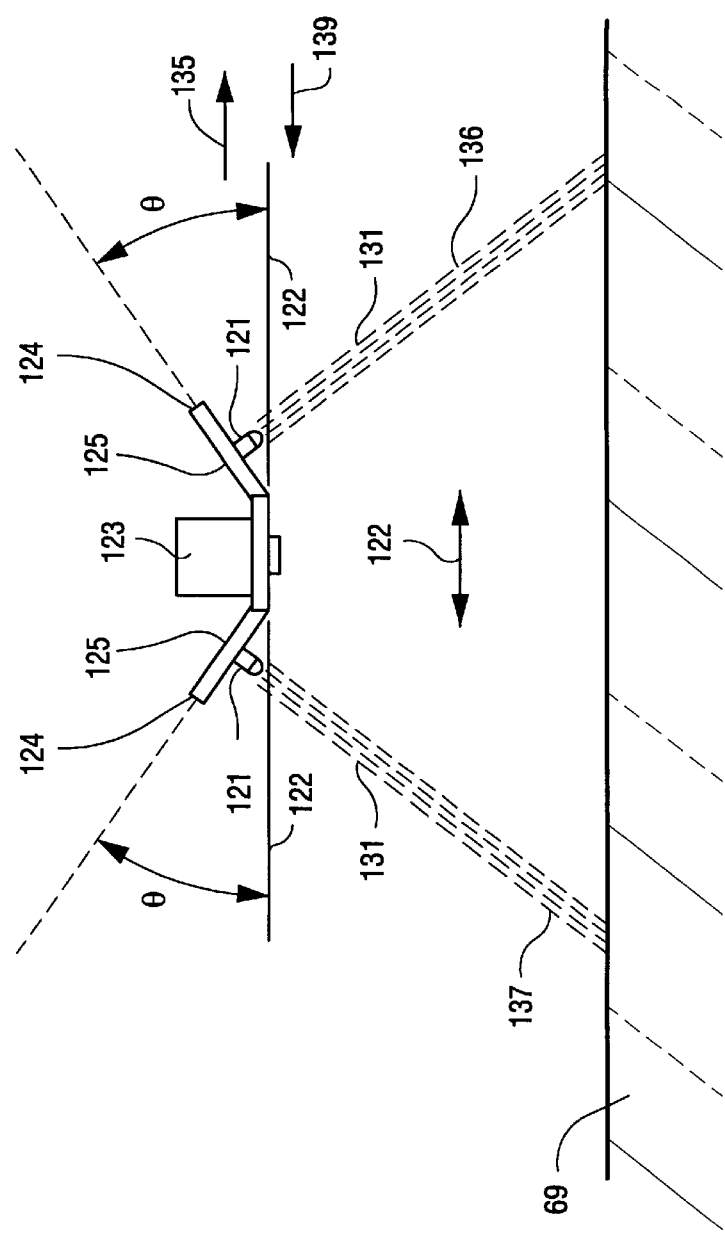
FIG. 15 is a top elevation view of two opposing nozzles of FIG. 13 directing liquid toward the surface of a glass sheet.

FIG. 15 is a top view illustrating a pair of nozzles 121 on a support 125 of tool 120. As tool 120 (including nozzles 121, member 123, and member 125) moves back and forth 134 in order to follow the contour of the surface of sheet 69, nozzles 121 preferably remain approximately the same predetermined distance away from the surface of sheet 69 due to the control of the manipulating robot arm 109.

Spray 131 from the lead nozzle 121 functions to shear dirt/powder off of the surface of glass sheet 69, while spray 131 from the trailing nozzle 121 functions to clean the sheet after dirt has been sheared therefrom. In other words, referring to FIG. 15, when tool 120 is being manipulated in direction 135 across the sheet's surface by the robot arm, spray 136 from the leading nozzle impacts the glass surface at an angle which enables shearing of dirt from the sheet, and is thus a "shearing" spray (i.e. the direction at which spray 136 is directed defines an angle of substantially less than 90 degrees relative to the direction 135 of tool travel). This shearing angle is caused by the angle φ defined between (i) a plane or axis 122 approximately parallel to the immediately adjacent sheet 69 surface, and (ii) support 124 from which nozzle 121 protrudes in an approximately perpendicular manner. Angle φ is preferably from about 20°–50°, most preferably about 37° according to certain embodiments. When the tool is traveling in this direction 135, the trailing spray 137 functions as the rinse-off or clean-up spray, as the direction which spray 137 is directed is opposite to the direction of tool travel 135 and substantially more than 90 degrees different than direction 135.

However, once tool 120 travels across an entire major surface of the glass sheet in direction 135 from one end to the other, tool 120 is stopped by the robot arm and its path is reversed. The tool then is moved in direction 139 back across the major surface of sheet 69, following its contour. When the tool proceeds in direction 139, leading spray 137 is the "shear" spray, while trailing spray 136 is the clean-up or rinse-off spray. This is because the direction at which spray 137 is directed defines an angle of substantially less than 90 degrees relative to the direction 139 of tool travel, thereby creating a shearing effect. Meanwhile, the direction at which trailing spray 136 is directed is substantially more than 90 degrees different than direction 139 of tool travel, thereby making this a rinsing spray. The provision of a shearing spray in each direction is caused by each nozzle 121 being mounted on and extending perpendicularly from a support 124 that defines an angle φ with each of plane/axis 122 and the plane defined by the immediately adjacent sheet 69 surface.

FIG. 16(*a*) is a front view of one leg of zone #2 tool 120, illustrating twenty seven different supports 125, and thus fifty four different nozzles 121 on the leg (for a total of fifty four supports 125 and one hundred eight nozzles on the tool including both opposing legs thereof). Tool 120 preferably has from about seventy to one hundred twenty nozzles total in certain embodiments. In certain preferred embodiments, the upper portion 141 of tool 120 is at or above the upper edge of glass sheet 69 during the spraying process, while the lower portion 143 is at or below the lower edge of the glass sheet during spraying. This enables each nozzle array of tool 120 to cover an entire major surface of the sheet, so that the entire surface is cleaned/rinsed when the tool is manipulated. Because the vertical expanse of tool 120 is large enough to cover all potential sheets to be washed, there is no need to replace the tool as a function of the sheet(s) size or shape to be washed as is the case with prior art brushes. Moreover, because tool 120 does not contact sheets 69, the chance of powder from the sheets coagulating on the tool is minimized. When large sheets 69 are being cleaned, all nozzles 121 may be actuated to spray the sheet; however, when small sheets are being cleaned certain nozzles may be deactuated, so that for example only the bottom half of nozzles is spraying to cover the entire surface to be cleaned, in order to save water.

Figure 17B:
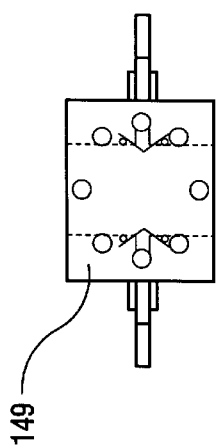
FIG. 17(b) is a top elevation view of the tool of FIG. 17(a), illustrating where the tool is to be affixed to the corresponding robot arm.

FIG. 17(*a*) is a side elevation view of tool 120, showing the two different nozzle arrays provided on respective legs thereof. First nozzle array on the inside edge of leg 145 is on one side of glass sheet 69, and the second nozzle array on the inside edge of leg 147 is on the other side of the sheet. Legs 145, 147 are preferably identical but oriented in opposing directions, and the supports may be of aluminum in certain embodiments. Each array includes a plurality of the nozzles shown in FIGS. 13–15 and 16(*a*). Top 149 of tool 120 is adapted to be connected to the end of robot arm 109 (see FIG. 9) so that tool 120 can be manipulated across the opposing surfaces of sheet 69, while the respective nozzle arrays straddle sheet 69. Members 151 function to support the respective legs 145, 147 against horizontal movement due to the force created by the plurality of nozzles 121 simultaneously spraying high pressure liquid 131 at the glass sheet. In certain preferred embodiments, supports 151 extends more than halfway down the length of legs 145, 147 to provide the needed support, which allows for a maximum leg deflection at leg bottoms of no more than about 0.0625 inches. FIG. 17(b) illustrates a top view of top 149 portion of the tool to be connected to the robot arm, via the array of apertures shown.

Figure 18:
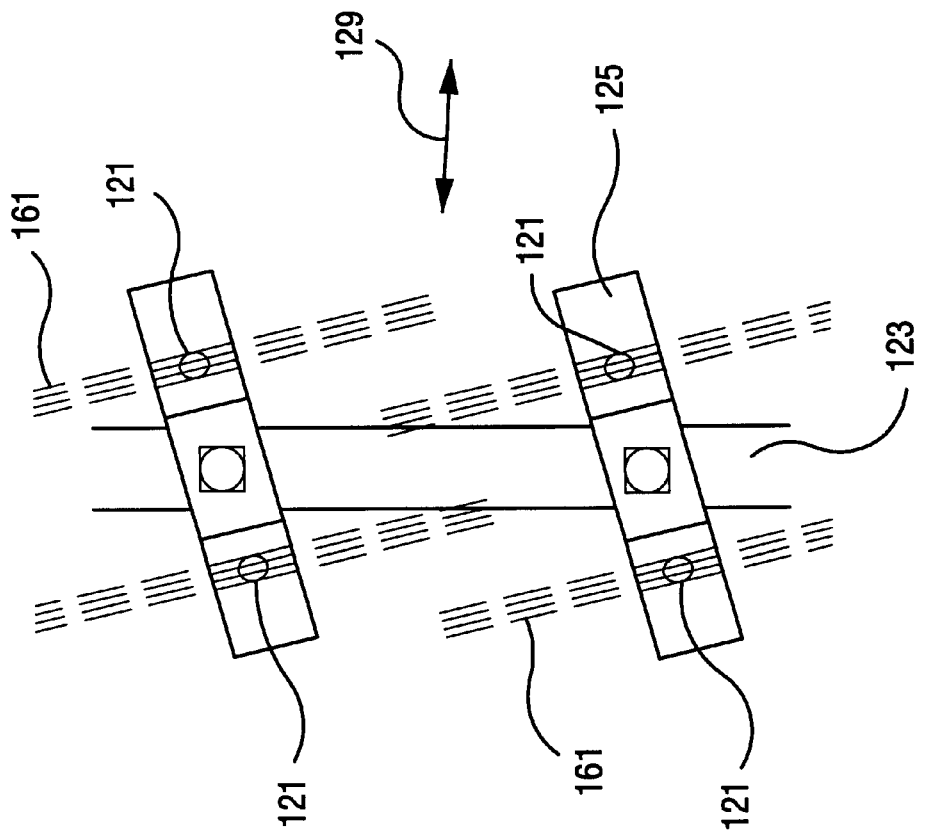
FIG. 18 is a front view of a plurality of nozzles utilized in the rinsing zone (i.e. zone #3) of the FIG. 3–17 embodiment.
Figure 19:
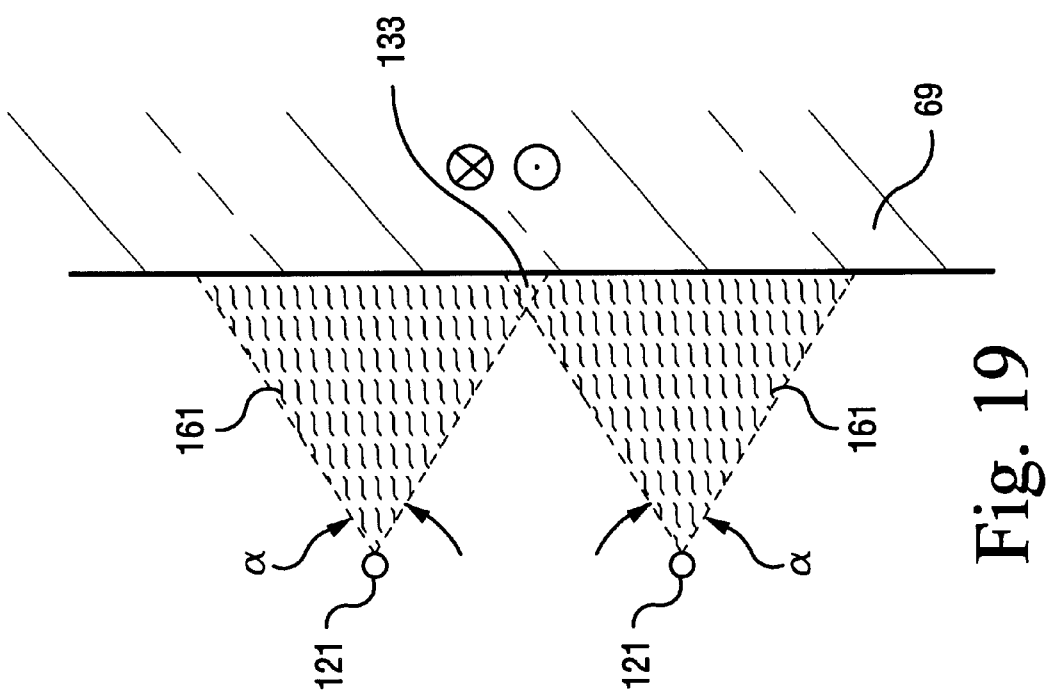
FIG. 19 is a side elevation view illustrating two of the FIG. 18 nozzles directing overlapping spray patterns onto a surface of a glass sheet.

While the spray tool illustrated in FIGS. 13–17 is especially applicable to "washing" in zone #2, it may also be utilized in zone #3 for rinsing. However, in certain preferred embodiments of this invention, the spray system in zone #3 differs from that in zone #2. The FIG. 18–19 zone #3 spray system differs from that of FIGS. 13–17 only in that fewer nozzles 121 and support members 125 are provided on support 123, and a larger spray pattern 161 is utilized for each nozzle. As shown in FIG. 19, a pair of vertically spaced nozzles 121 on the same side of support 123 each output a spray 161 which overlaps at 133. However, the angle α defined by the upper and lower edges of the spray patterns, as shown in FIG. 19, is preferably from about 50°–80°, most preferably about 65°. This larger spray angle is utilized during rinsing in zone #3, because less force is needed during the rinsing process than during washing.

FIG. 16(b) is a top view illustrating in broken lines the contour following paths 165 and 167 which nozzle array tools 120 travel on opposite sides of sheet 69 in zone #s 2–3. Referring to FIGS. 16(b) and 17(a), for example, leg 145 of tool 120 and nozzles 121 on that leg travel back and forth along path 167 in order to spray major surface 169, while leg 147 and nozzles 121 thereon travel back and forth along path 165 in order to spray the other major surface 171 of sheet 69. Upper portion 149 of tool 120 allows legs 145 and 147 to be rigidly connected to one another during the spray process while both are simultaneously moved back and forth across opposing surfaces of sheet 69.

For purposes of example only, an exemplary spray process in either zone #2 or zone #3 will now be described. Glass sheet 69 is first conveyed into the zone and stopped so as to remain stationary in approximately the middle of the zone. The roll-up walls 79 are moved downward in order to isolate the zone. Thereafter, robot arm 109 carrying tool 120 manipulates the tool to an edge of the sheet so that leg 145 extends on one side of the sheet and leg 147 on the other. The initial position of tool 120 is proximate location A shown in FIG. 16(b). The nozzles 121 on both legs 145 and 147 are then opened and the spray process begins. The robot arm then continuously manipulates tool 120 from location A to location B, along path 165, 167 to location C, further along the path to location D and finally to location E. Once tool 120 has been continuously moved across the glass sheet, it is stopped at location E, and its direction reversed. The robot arm then continuously moves tool 120 from location F, to location G, and along path 165, 167 to location H. Spraying then stops. The robot arm lifts tool 120 upwardly away, or pulls the tool away, from the glass sheet and the cycle is over.

The time taken for manipulation of tool 120 across sheet 69, and then back again, is dictated by the length of the cycle. For example, if the cycle time is programmed to be 40 seconds, then the robot will take 20 seconds in moving the tool from location A to location E, and another 20 seconds from location F to location H. Locations A and H correspond with one another, as do locations E and F.

It is to be understood that when the tool is being moved back and forth along path 165, leg 147 is moving along path 165 while simultaneously leg 145 is moving along path 167 on the opposite side of sheet 69. When the spray nozzles are manipulated in zone #s 2–3 along paths 165, 167 across sheet 69, the nozzles are maintained during such manipulation at approximately a predetermined distance (e.g. from about 5 to 9 inches, preferably from about 6.0 to 8 inches) from the glass surface, so as to follow the contour of the sheet.

FIG. 16(b) illustrates paths 165, 167 which a tool 120, 181 may take when tracking the contour of a full windshield sheet 69 of glass (i.e. there are curves on both ends of the sheet in a full windshield). Another exemplary full windshield sheet 69 is shown in FIGS. 32–34. However, it is noted that half-windshield sheets 69, such as that shown in FIGS. 29–31, may also be washed/dried using contour tracking paths according to different embodiments herein. In preferred half-windshield embodiments, the tool 120, 181 starts at the most straight end of the sheet and proceeds to the curved end tracking the contour as with paths 165, 167, and then the tool reverses direction to come back across the same path from the curved end to the straight end.

Tool 120 as shown in the drawings includes first and second arrays of nozzles 121 thereon (one array on each leg 145, 147) for directing liquid toward the sheet. However, in alternative embodiments, tool 120 may include a single spray device on each leg for directing an elongated vertically oriented sheet of liquid at the major surfaces over an expanse so as to cover the entire sheet.

Figure 21:
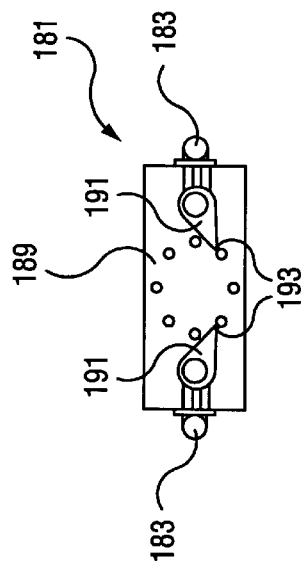
FIG. 21 is a top view of the tool of FIG. 20.
Figure 20:
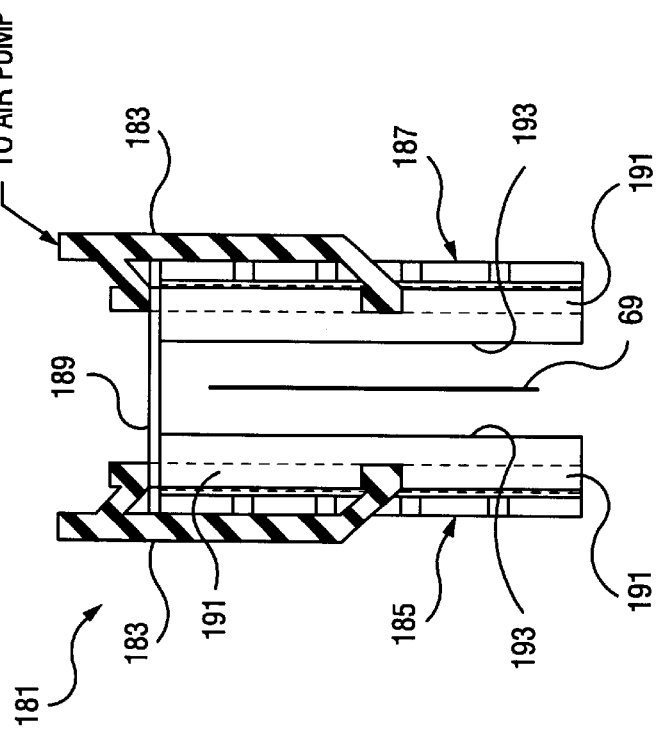
FIG. 20 is a side elevation view of a tool including opposing air blowing or drying knives to be provided on opposite sides of a glass sheet in the drying zone (i.e. zone #4) of the FIG. 3–19 apparatus.
Figure 22:
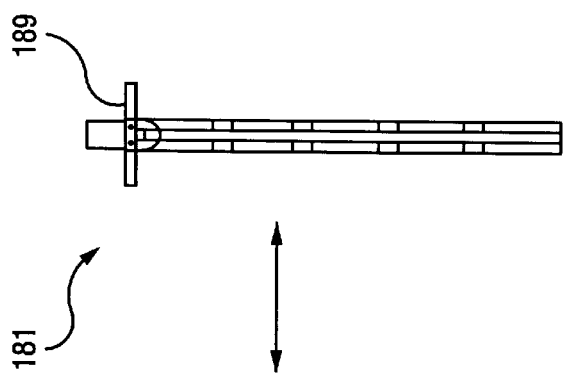
FIG. 22 is a front view of the tool of FIG. 20.

FIGS. 20–22 illustrate air blowing tool 181 adapted to be connected to the end of a robot arm 109 in zone #4 (59). FIG. 20 is a side elevation view of the tool, FIG. 21 a top view of the tool illustrating where it is to be connected to the robot arm, and FIG. 22 a front or end view of the tool. Tool 181 blows air and removes water from sheet 69 in zone #4 (i.e. dries the sheet). High pressure air is blown into the tool via conduits 183, one provided on each arm/leg 185, 187. The two legs are rigidly connected to one another by top portion 189. Once in a manifold 191, air is forced out of a small elongated continuous aperture 193 therein, toward glass 69 at a high pressure. In preferred embodiments, a single elongated air knife aperture 193 is provided on each leg so that a single continuous and elongated high pressure air stream sheet is directed toward and onto each major surface of a sheet 69.

Each air knife aperture 193 may be about 67 inches long in certain embodiments, and be adapted to be vertically oriented during operation. In certain embodiments, the substantially flat or planar air streams (e.g. typically having a width of about 1 inch or less) output from apertures 193 impact the glass at an angle of from about 15 to 60 degrees, more preferably at an angle of from about 35 to 55 degrees, and most preferably at an angle of about 45 degrees in the direction of sweep, so as to help push water particles in one direction The air knives mounted on legs 185, 187 are capable of drying wet glass while moving over the sheet surface at a minimal rate of about 150 mm/sec. The knives may be of or include alloyed aluminum in certain embodiments.

Referring to FIGS. 16(b) and 20–21, the robot arm manipulates tool 181 along the contour of glass sheet 69, back and forth via paths 165 and 167 as described above with reference to FIG. 16(b). Leg 187 is moved along path 165 while simultaneously leg 185 is moved along path 167 in order to blow residual liquid off of both major surfaces of sheet 69. In certain embodiments, the controller causes each of the spray tools in zone #s 2 and 3, as well as the air knife tool 181 in zone #4, to follow the same paths 165, 167 for a given sheet 69 of glass. Exemplary air knives may be obtained from Invincible AirFlow Systems, Baltic, Ohio.

In certain embodiments, one or two air blowers may be provided for forwarding air to the knives on tool 181 via 4 inch OD intakes. In single blower embodiments, a unit capable of at least about 4.2 psig for both air knives on tool 181 is preferable, with a minimum overall airflow of 2375 SCFM at a velocity of 36,917 ft/min. A 75 HP motor may be used for the blower. In double blower unit embodiments, each unit should be capable of 4.2 psig for a single 67" air knife and a minimum overall airflow of 1187 SCFM at a velocity of 36,917 ft/min, and a 30 HP motor may be used for each unit that drives a single knife. Air knives in certain embodiments herein may be constructed of stainless steel. In preferred embodiments, the air knives on legs 185 and 187 of tool 181 sweep across the opposing surfaces of a sheet 69 at a distance of no closer than about 5 inches from the glass. The knives, like the nozzles, are preferably maintained at a predetermined distance of from about 5–9 inches, most preferably from about 6–8 inches, from the glass surface as the knives are moved along paths 165, 167, in order to follow any curved contour of sheet 69.

FIGS. 23–25 illustrate an exemplary reservoir or water pan which may be utilized as any or all of pans 61, 63, 65, and/or 67 in certain embodiments hereof. FIG. 23 is an end view of the pan, FIG. 24 a top view, and FIG. 25 a side view. Each pan includes four sidewalls 201 which define therebetween a water retention or reservoir area for holding water, RO water, or other cleaning fluid. Each pan may also include a heater 203 for heating water. Each pan includes a handle member 205 which allows the pan to be selectively removed and replaced. In certain embodiments, each water collection pan may be provided with rollers underneath of the pan on a platform, for ease of pan movement.

Figure 27:
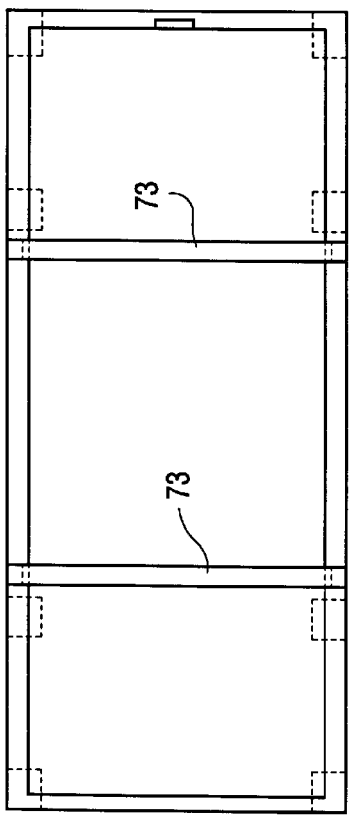
FIG. 27 is a top view of the apparatus portion of FIG. 26, which may be used in any or all zones herein.
Figure 26:
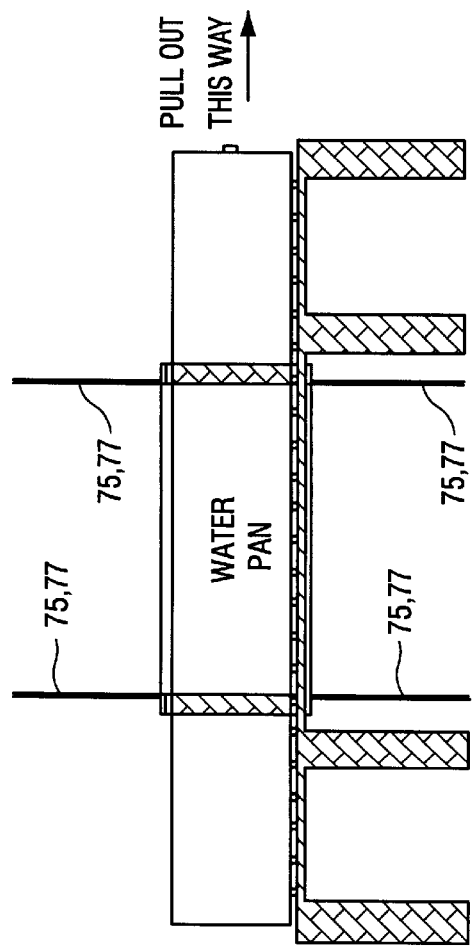
FIG. 26 is a front or end view of a portion of a stand-alone zone of the apparatus of FIGS. 3–7.
Figure 28:
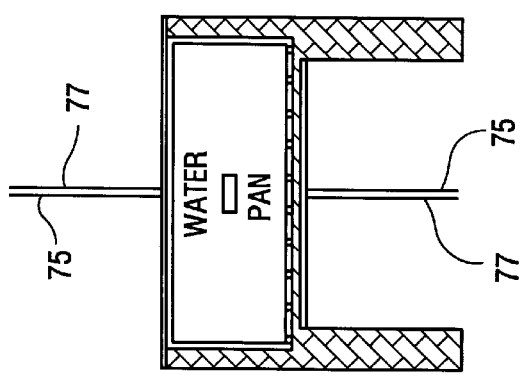
FIG. 28 is a side view of the apparatus portion of FIGS. 26–27.

FIG. 26 is a front or end view of the conveyor of the apparatus shown in FIGS. 3–9, while FIG. 27 is a top view of the conveyor, and FIG. 28 is a side view of the conveyor. These figures illustrate the conveyor in only one particular zone.

Figure 35:
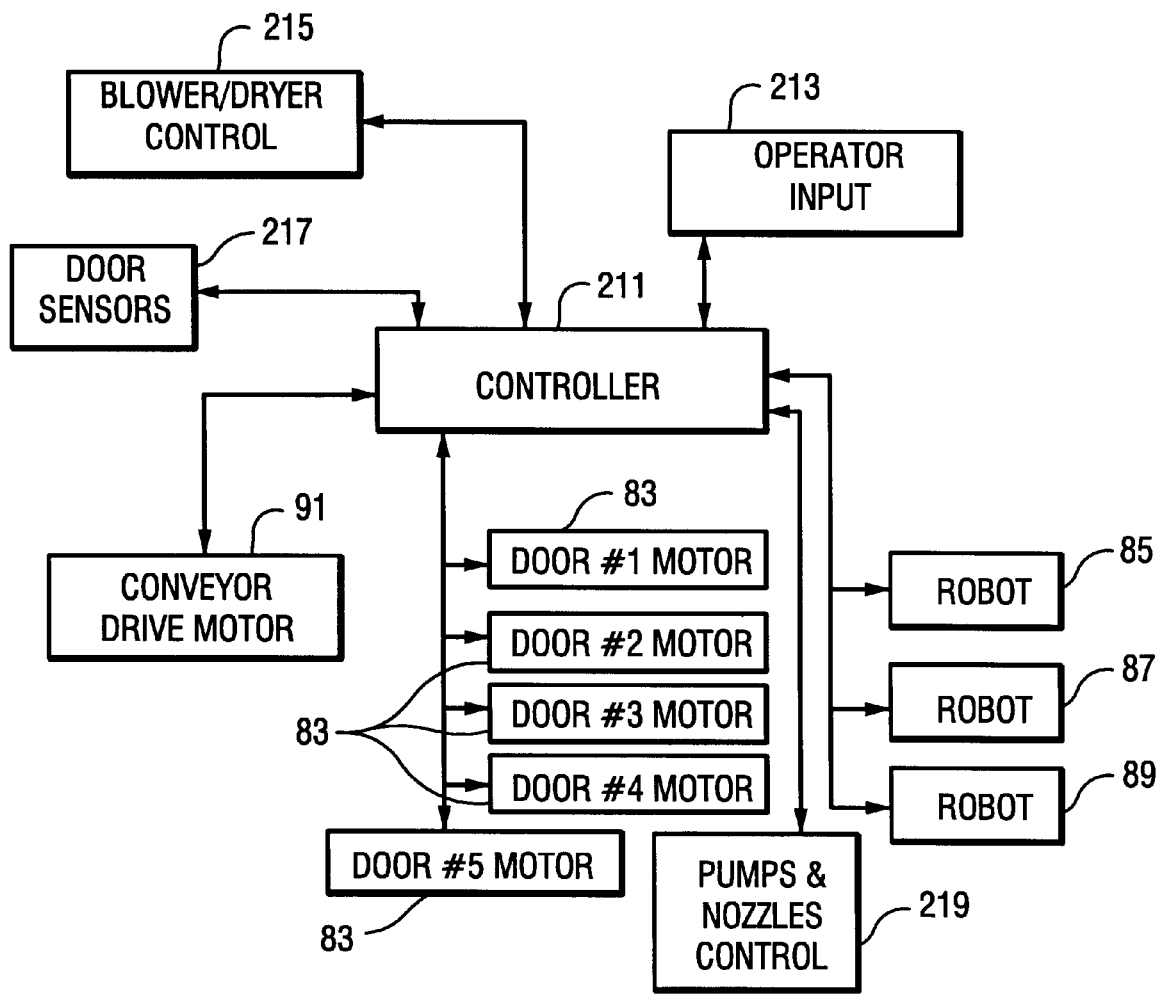
FIG. 35 is a block diagram of a control system utilized in implementing a cleaning apparatus according to certain embodiments of this invention.

Referring to FIG. 35, controller 211 is in communication with operator input terminal 213, blower/dryer control 215, wall 79 sensors 217, conveyor drive motor 91, robots 85–89, pump and nozzle controls 219, and door motors 83. For purposes of example only without limitation, when a sheet 69 is loaded onto the conveyor at station 50, an operator utilizing a keyboard at input 213 enters a model number or code indicative of the size and shape of the sheet 69 to controller 211. Controller 211, utilizing a look-up table or memory therein, retrieves apparatus parameters (e.g. robot control information, contour information, size information, etc.) corresponding to that sheet. When that sheet 69 reaches zone #2, controller 211 instructs robot 85 to manipulate the spray nozzles about a predetermined path 165, 167 corresponding to the shape/contour of that sheet retrieved from the controller's memory/table. In a similar manner, when that sheet reaches zone #s 3–4, controller 211 instructs the robots in those zones to manipulate their tools along the same paths utilized in zone #2, which corresponds to the shape and contour of the sheet. In certain embodiments, controller 211 may retrieve the contour/path information regarding a particular sheet 69, and copy that information to all three robots 85–89 either simultaneously or in serial fashion, so that robots in zone #s 2–4 all manipulate their tools along the same path for a given sheet 69.

Because different sizes and/or shapes of sheets 69 have different contours, different tool paths 165, 167 are required. In other words, robots follow different tool paths for different sheets, as a function of sheet contour. Controller 211, upon receiving the type of sheet loaded from input 213, instructs robots 85–89 as to which path(s) 165, 167 to follow for each sheet in the apparatus. Thus, for example, the robot 85 in zone #2 may manipulate its tool 120 along five different paths for five successive sheets 69 having different shapes. This ensures that the spray nozzles and air knives in the different zones are always controlled so as to follow the contour of the applicable sheet 69, regardless of its shape.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A glass cleaning apparatus comprising:

a conveyor for moving a curved sheet of glass having a curved contour into a washing zone in a substantially upright orientation;

a first spray tool including a first leg upon which a first array of nozzles is mounted for spraying a liquid toward the sheet of glass and a second array of nozzle supported by a second leg on the first spray tool for spraying the liquid toward the sheet of glass;

a first arm for simultaneously moving said first leg and second leg in a curved path following the curved contour of the sheet of glass so that said first array of nozzles direct the liquid toward a first major surface of the glass sheet when said first spray tool is moving in the curved path while simultaneously said second array of nozzles direct liquid toward a second opposite major surface of the glass sheet when said sheet is disposed at least partially between said first and second array of nozzles.

2. The apparatus of claim 1, further comprising:

a rinsing zone in which a second spray tool is provided for spraying liquid toward the sheet of glass after the conveyor has moved the sheet of glass from the washing zone into said rinsing zone;

a second arm provided in said rinsing zone for moving said second spray tool in the curved path following the curved contour of the sheet of glass so that said second spray tool directs rinsing liquid toward the first major surface of the glass sheet when said second spray tool is moving in the curved path;

a drying zone in which a third tool is provided for directing a sheet of high pressure air toward the sheet of glass in order to remove liquid from the sheet of glass; and a third arm provided in said drying zone for moving said third tool in the curved path following the curved contour of the sheet of glass so that said third tool directs the sheet of air toward the first major surface of the glass sheet when said third tool is moving in the curved path.

3. The apparatus of claim 2, further comprising:

first, second, and third liquid receiving pans or reservoirs located at bottom portions of said washing, rinsing, and drying zones, respectively, and wherein said washing, rinsing, and drying zones are isolated from one another by selectively deployable walls provided therebetween.

4. The apparatus of claim 1, further comprising:

first and second upstanding elongated members provided on said conveyor for supporting the sheet of glass in said washing zone, wherein the sheet is adapted to lean against said first and second upstanding elongated members when in said washing zone.

5. The apparatus of claim 4, further comprising:

third and fourth upstanding elongated members provided on said conveyor for supporting the sheet of glass in said washing zone, wherein said first and second upstanding members are adapted to be positioned on one side of the sheet of glass while said third and fourth upstanding members are adapted to be positioned on the other side of the sheet of glass.

6. The apparatus of claim 5, wherein said first and second upstanding members are substantially longer than said third and fourth elongated members.

7. The apparatus of claim 1, wherein the sheet is stationary when the first and second legs of the spray tool are moved along the respective contours of the sheet on opposite sides of the sheet.

8. The apparatus of claim 1, wherein said first and second legs of said first spray tool further comprise:

an elongated support member adapted to be oriented in a substantially vertical manner across the first major surface of the sheet of glass;

a plurality of nozzle supporting members connected to said elongated support member, each of said nozzle supporting members supporting first and second nozzles in order to make up at least a portion of said first or second array of nozzles; and wherein, on a plurality of said nozzle supporting members, the first nozzle is located on one side of said elongated support member and the second nozzle is located on the other side of said elongated support member.

9. The apparatus of claim 8, wherein for a plurality of said nozzle supporting members, an axis or line drawn through the first and second nozzles on said nozzle supporting member defines an angle $\theta$ of from about 5–30 degrees with an axis perpendicular to a centerline or axis of said elongated support member, so that vertically adjacent spray patterns from vertically adjacent nozzles in said first array do not substantially diffuse one another; and wherein said conveyor moves glass sheets thereon in a non-continuous manner such that sheets remain stationary in the washing zone during washing.

* * * * *